United States Patent
Williams, Jr. et al.

(10) Patent No.: US 8,905,425 B2
(45) Date of Patent: Dec. 9, 2014

(54) HITCH APPARATUS FOR VEHICLES

(75) Inventors: Thomas M. Williams, Jr., Durham, NC (US); Gregory S. Hopper, Raleigh, NC (US); Kamyar Kheradpir, Durham, NC (US)

(73) Assignee: TeleSwivel, LLC, Durham, NC (US)

( * ) Notice: Subject to any disclaimer, the term of this patent is extended or adjusted under 35 U.S.C. 154(b) by 885 days.

(21) Appl. No.: 12/970,439

(22) Filed: Dec. 16, 2010

(65) Prior Publication Data

US 2011/0221166 A1 Sep. 15, 2011

Related U.S. Application Data

(60) Provisional application No. 61/312,056, filed on Mar. 9, 2010.

(51) Int. Cl.
*B60D 1/36* (2006.01)
*B60D 1/40* (2006.01)
*B60D 1/01* (2006.01)

(52) U.S. Cl.
CPC ... *B60D 1/01* (2013.01); *B60D 1/36* (2013.01)
USPC .................................. 280/479.3; 280/478.1

(58) Field of Classification Search
CPC ............. B60D 1/01; B60D 1/36; B60D 1/40; B60D 1/363
USPC ................ 280/477, 478.1, 479.2, 479.3, 482, 280/491.1, 491.2, 499
See application file for complete search history.

(56) References Cited

U.S. PATENT DOCUMENTS

| | | | |
|---|---|---|---|
| 2,871,029 A * | 1/1959 | Demarest | 280/477 |
| 2,988,383 A | 6/1961 | Carson | |
| 3,057,644 A | 10/1962 | Fisher | |
| 3,093,395 A | 6/1963 | Boutwell | |
| 3,140,881 A | 7/1964 | Antici | |
| 3,169,028 A | 2/1965 | Scrivner | |
| 3,169,782 A | 2/1965 | Columbus | |
| 3,207,530 A | 9/1965 | Paun | |
| 3,243,202 A | 3/1966 | Carson | |

(Continued)

OTHER PUBLICATIONS

International Preliminary Report on Patentability Corresponding to International Application No. PCT/US2010/060959; Date of Mailing: Sep. 20, 2012; 7 Pages.

(Continued)

*Primary Examiner* — Anne Marie Boehler
(74) *Attorney, Agent, or Firm* — Myers Bigel Sibley & Sajovec

(57) ABSTRACT

A hitch apparatus includes a housing and a tow bar movably disposed within the housing. The housing includes spaced-apart first and second sections. At least one of the sections includes an elongated slot. The tow bar includes a guide member that extends outwardly from the tow bar at the proximal end thereof and that is operably engaged with the slot. The housing may include a pair of tow bar guide doors pivotally secured between the first and second sections that limit the extent which the tow bar pivots and that guide the tow bar as it is retracted. The housing may include a pair of guide posts extending between the first and second sections and the tow bar may include a pair of guide wings that contact the guide posts to limit the extent to which the tow bar can pivot and guide the tow bar as it is retracted.

32 Claims, 17 Drawing Sheets

(56) References Cited

U.S. PATENT DOCUMENTS

| | | |
|---|---|---|
| 3,279,825 A | 10/1966 | Boutwell |
| 3,400,949 A | 9/1968 | Kendall |
| 3,410,577 A | 11/1968 | Luinstra |
| 3,565,459 A * | 2/1971 | Reid ........................... 280/477 |
| 3,596,925 A | 8/1971 | Richie |
| 3,612,576 A * | 10/1971 | Marler ..................... 280/479.3 |
| 3,659,875 A | 5/1972 | Masar |
| 3,675,947 A | 7/1972 | Blagg |
| 3,677,565 A | 7/1972 | Slosiarek |
| 3,700,053 A | 10/1972 | Glissendorf |
| 3,702,029 A | 11/1972 | Anderson, Jr. |
| 3,720,000 A | 3/1973 | Schlegel |
| 3,724,874 A * | 4/1973 | Simpson ..................... 280/408 |
| 3,734,539 A | 5/1973 | Salmi |
| 3,740,077 A | 6/1973 | Williams |
| 3,747,958 A | 7/1973 | Hackett |
| 3,767,230 A | 10/1973 | DeVries |
| 3,773,356 A | 11/1973 | Eichels et al. |
| 3,774,149 A | 11/1973 | Bennett |
| 3,807,767 A | 4/1974 | Moline |
| 3,818,599 A | 6/1974 | Tague |
| 3,833,243 A | 9/1974 | Hanson |
| 3,858,966 A | 1/1975 | Lowell, Jr. |
| 3,867,898 A | 2/1975 | Lakamp |
| 3,879,062 A | 4/1975 | Miller |
| 3,881,748 A | 5/1975 | Donaldson |
| 3,889,384 A | 6/1975 | White |
| 3,891,237 A | 6/1975 | Allen |
| 3,891,238 A | 6/1975 | Ehlert |
| 3,901,536 A | 8/1975 | Black |
| 3,909,033 A | 9/1975 | Russell, Jr. |
| RE28,590 E | 10/1975 | Salmi |
| 3,912,119 A | 10/1975 | Hill et al. |
| 3,912,302 A | 10/1975 | Patterson |
| 3,918,746 A | 11/1975 | Lehtisaari |
| 3,922,006 A | 11/1975 | Borges |
| 3,924,257 A | 12/1975 | Roberts |
| 3,929,237 A | 12/1975 | Schaedler |
| 3,944,259 A | 3/1976 | Miller |
| 3,961,677 A | 6/1976 | Geisthoff |
| 3,964,767 A | 6/1976 | Williams |
| 3,966,231 A | 6/1976 | Metzler |
| 4,012,056 A | 3/1977 | Christensen |
| 4,030,775 A | 6/1977 | Hill |
| 4,054,302 A | 10/1977 | Campbell |
| 4,057,266 A | 11/1977 | Duncan et al. |
| 4,065,147 A | 12/1977 | Ross |
| 4,078,774 A | 3/1978 | Williams |
| 4,131,295 A | 12/1978 | Highberger |
| 4,131,296 A | 12/1978 | Strader |
| 4,134,602 A | 1/1979 | Boger |
| 4,156,972 A | 6/1979 | Vankrevelen |
| 4,169,610 A | 10/1979 | Paufler |
| 4,173,353 A | 11/1979 | Steele |
| 4,178,011 A | 12/1979 | Kirsch |
| 4,186,939 A | 2/1980 | Woods et al. |
| 4,187,494 A | 2/1980 | Jessee |
| 4,192,526 A | 3/1980 | Myers |
| 4,205,453 A | 6/1980 | Steele |
| 4,225,149 A | 9/1980 | Koopman |
| 4,226,438 A | 10/1980 | Collins |
| 4,254,968 A | 3/1981 | DelVecchio |
| 4,254,969 A | 3/1981 | Martin |
| 4,265,465 A | 5/1981 | Deitrich, Sr. |
| 4,269,428 A | 5/1981 | Rexine |
| 4,313,264 A | 2/1982 | Miller, Sr. |
| 4,416,466 A | 11/1983 | Park |
| 4,417,748 A | 11/1983 | Dortch |
| 4,431,208 A | 2/1984 | Geeves |
| 4,432,563 A | 2/1984 | Pitcher |
| 4,484,760 A | 11/1984 | Rach |
| 4,511,159 A | 4/1985 | Younger |
| 4,515,387 A | 5/1985 | Schuck |
| 4,537,416 A | 8/1985 | Linaburg |
| 4,545,595 A | 10/1985 | Gray |
| 4,552,376 A | 11/1985 | Cofer |
| 4,558,883 A * | 12/1985 | Bouma ..................... 280/479.3 |
| 4,560,183 A | 12/1985 | Cook |
| 4,560,184 A | 12/1985 | Williams, Jr. |
| 4,583,481 A | 4/1986 | Garrison |
| 4,603,878 A | 8/1986 | Smith, Jr. |
| 4,606,549 A | 8/1986 | Williams, Jr. |
| 4,613,149 A | 9/1986 | Williams, Jr. |
| 4,614,356 A | 9/1986 | Mills |
| 4,621,432 A | 11/1986 | Law |
| 4,627,634 A | 12/1986 | Coleman |
| 4,650,207 A | 3/1987 | Ackermann |
| 4,657,275 A | 4/1987 | Carroll |
| 4,657,276 A | 4/1987 | Hamerl |
| 4,666,176 A | 5/1987 | Sand |
| 4,666,177 A | 5/1987 | Vinchattle |
| 4,674,942 A | 6/1987 | Assh et al. |
| 4,687,220 A | 8/1987 | Danielson |
| 4,708,359 A | 11/1987 | Davenport |
| 4,759,564 A | 7/1988 | Williams, Jr. |
| 4,772,040 A | 9/1988 | Klemm |
| 4,773,667 A * | 9/1988 | Elkins ..................... 280/479.3 |
| 4,781,394 A | 11/1988 | Schwarz et al. |
| 4,792,151 A | 12/1988 | Feld |
| 4,799,705 A | 1/1989 | Janes et al. |
| 4,802,686 A | 2/1989 | Isreal |
| 4,807,714 A | 2/1989 | Blau et al. |
| 4,807,899 A | 2/1989 | Belcher |
| 4,811,965 A | 3/1989 | Eubanks |
| 4,840,392 A | 6/1989 | Baskett |
| 4,844,496 A | 7/1989 | Webb et al. |
| 4,844,497 A | 7/1989 | Allen |
| 4,852,901 A | 8/1989 | Beasley et al. |
| 4,854,604 A | 8/1989 | Stallsworth |
| 4,861,061 A | 8/1989 | Frantz |
| 4,871,184 A | 10/1989 | Johnson |
| 4,871,185 A | 10/1989 | Chakroff et al. |
| 4,903,978 A | 2/1990 | Schrum, III |
| 4,905,376 A | 3/1990 | Neeley |
| 4,913,451 A | 4/1990 | Woodall |
| 4,938,495 A | 7/1990 | Beasley et al. |
| 4,944,525 A | 7/1990 | Landry |
| 4,951,957 A | 8/1990 | Gullickson |
| 4,953,883 A | 9/1990 | Helie |
| 4,958,436 A | 9/1990 | Tusche |
| 4,961,589 A | 10/1990 | Faurenhoff |
| 4,961,590 A | 10/1990 | Davenport |
| 4,974,866 A | 12/1990 | Morgan |
| 4,976,453 A | 12/1990 | Kaplan |
| 4,988,116 A | 1/1991 | Evertsen |
| 4,991,865 A | 2/1991 | Francisco |
| 5,000,471 A | 3/1991 | Sumrall |
| 5,005,852 A | 4/1991 | Smyly, Sr. |
| 5,009,444 A | 4/1991 | Williams, Jr. |
| 5,009,445 A | 4/1991 | Williams, Jr. |
| 5,009,446 A | 4/1991 | Davis |
| 5,016,900 A | 5/1991 | McCully |
| 5,035,441 A | 7/1991 | Murray |
| 5,036,593 A | 8/1991 | Collier |
| 5,037,123 A | 8/1991 | Smith |
| 5,048,854 A | 9/1991 | Clark |
| 5,067,742 A | 11/1991 | Relja |
| 5,080,386 A | 1/1992 | Lazar |
| 5,085,408 A | 2/1992 | Norton et al. |
| 5,108,123 A | 4/1992 | Rubenzik |
| 5,113,588 A | 5/1992 | Walston |
| 5,114,168 A | 5/1992 | Kehl |
| 5,114,170 A | 5/1992 | Lanni et al. |
| 5,115,572 A | 5/1992 | Harbison |
| 5,161,815 A | 11/1992 | Penor, Jr. |
| 5,180,182 A | 1/1993 | Haworth |
| 5,188,385 A | 2/1993 | Wilson |
| 5,191,328 A | 3/1993 | Nelson |
| 5,195,769 A | 3/1993 | Williams, Jr. |
| 5,201,539 A | 4/1993 | Mayfield |
| 5,203,582 A | 4/1993 | Smyly, Sr. |
| 5,213,354 A | 5/1993 | Vaughn |
| 5,224,270 A | 7/1993 | Burrus |
| 5,236,214 A | 8/1993 | Taylor |

(56) References Cited

U.S. PATENT DOCUMENTS

| | | |
|---|---|---|
| 5,236,215 A | 8/1993 | Wylie |
| 5,257,797 A | 11/1993 | Johnson |
| 5,269,554 A | 12/1993 | Law et al. |
| 5,277,446 A | 1/1994 | Hamel |
| 5,277,447 A | 1/1994 | Blaser |
| 5,286,050 A | 2/1994 | Stallings, Jr. et al. |
| 5,288,095 A | 2/1994 | Swindall |
| 5,288,096 A | 2/1994 | Degelman |
| 5,290,056 A | 3/1994 | Fath, IV |
| 5,309,289 A | 5/1994 | Johnson |
| 5,316,330 A | 5/1994 | Bergeron |
| 5,322,315 A | 6/1994 | Carsten |
| 5,330,196 A | 7/1994 | Ricles |
| 5,335,930 A | 8/1994 | Tighe |
| 5,342,076 A | 8/1994 | Swindall |
| 5,348,329 A | 9/1994 | Morin et al. |
| 5,382,042 A | 1/1995 | McPhee et al. |
| 5,405,160 A | 4/1995 | Weaver |
| 5,413,369 A | 5/1995 | Trent |
| 5,454,582 A | 10/1995 | Rines |
| 5,461,471 A | 10/1995 | Sommerfeld |
| 5,465,992 A | 11/1995 | Anderson |
| 5,468,007 A | 11/1995 | Kanerva |
| 5,478,101 A | 12/1995 | Roberson |
| 5,482,310 A | 1/1996 | Staggs |
| 5,503,422 A | 4/1996 | Austin |
| 5,503,423 A | 4/1996 | Roberts et al. |
| 5,516,139 A | 5/1996 | Woods |
| 5,518,263 A | 5/1996 | Owens |
| 5,529,330 A | 6/1996 | Roman |
| 5,547,210 A | 8/1996 | Dugger |
| 5,558,352 A | 9/1996 | Mills |
| 5,580,088 A | 12/1996 | Griffith |
| 5,593,171 A | 1/1997 | Shields |
| 5,630,606 A | 5/1997 | Ryan |
| 5,636,885 A | 6/1997 | Hummel |
| 5,657,175 A | 8/1997 | Brewington |
| 5,669,621 A | 9/1997 | Lockwood |
| 5,680,706 A | 10/1997 | Talcott |
| 5,725,232 A | 3/1998 | Fleming |
| 5,727,805 A | 3/1998 | La Roque |
| 5,729,194 A | 3/1998 | Spears et al. |
| 5,758,893 A | 6/1998 | Schultz |
| 5,769,443 A | 6/1998 | Muzny |
| 5,779,256 A | 7/1998 | Vass |
| 5,784,213 A | 7/1998 | Howard |
| 5,797,616 A | 8/1998 | Clement |
| 5,806,196 A | 9/1998 | Gibbs et al. |
| 5,821,852 A | 10/1998 | Fairchild |
| 5,882,029 A | 3/1999 | Kennedy |
| 5,890,617 A | 4/1999 | Rowland et al. |
| 5,909,892 A | 6/1999 | Richardson |
| 5,927,229 A | 7/1999 | Karr, Jr. |
| 5,927,742 A | 7/1999 | Draper |
| 5,941,551 A | 8/1999 | Harman et al. |
| 5,951,035 A | 9/1999 | Phillips, Jr. et al. |
| 5,951,036 A | 9/1999 | Sargent |
| 5,979,927 A | 11/1999 | Hale |
| 5,992,871 A | 11/1999 | Rowland et al. |
| 6,042,136 A | 3/2000 | Heinecke |
| 6,068,281 A | 5/2000 | Szczypski |
| 6,076,847 A | 6/2000 | Thornton |
| 6,102,422 A | 8/2000 | Damron |
| 6,102,423 A | 8/2000 | Beck et al. |
| 6,120,052 A | 9/2000 | Capik et al. |
| 6,139,041 A | 10/2000 | Murphy |
| 6,168,181 B1 | 1/2001 | Gadd |
| 6,170,852 B1 | 1/2001 | Kimbrough |
| 6,176,505 B1 | 1/2001 | Capik et al. |
| 6,178,650 B1 | 1/2001 | Thibodeaux |
| 6,193,258 B1 | 2/2001 | Kennedy |
| 6,199,503 B1 | 3/2001 | Midgett |
| 6,209,902 B1 | 4/2001 | Potts |
| 6,213,608 B1 | 4/2001 | Osgood |
| 6,222,457 B1 | 4/2001 | Mills et al. |
| 6,234,510 B1 | 5/2001 | Hammons |
| 6,239,926 B1 | 5/2001 | De Shazer |
| 6,273,448 B1 | 8/2001 | Cross |
| 6,279,940 B1 | 8/2001 | Beavington |
| 6,286,851 B1 | 9/2001 | Sargent |
| 6,286,852 B1 | 9/2001 | Slatten |
| 6,299,191 B1 | 10/2001 | Sargent |
| 6,318,747 B1 | 11/2001 | Ratican |
| 6,328,326 B1 * | 12/2001 | Slatten ...................... 280/479.3 |
| 6,341,794 B1 | 1/2002 | Hunter |
| 6,357,126 B1 | 3/2002 | Gillen, Jr. |
| 6,364,337 B1 | 4/2002 | Rowland et al. |
| 6,378,888 B1 | 4/2002 | Laurent |
| 6,382,653 B1 | 5/2002 | Bass |
| 6,386,514 B1 | 5/2002 | Ray |
| 6,386,572 B1 | 5/2002 | Cofer |
| 6,409,200 B1 | 6/2002 | Glass |
| 6,422,585 B1 | 7/2002 | Glass |
| 6,428,030 B2 | 8/2002 | Melesko et al. |
| 6,446,999 B1 | 9/2002 | Davis, Jr. |
| 6,454,290 B1 | 9/2002 | Turner |
| 6,478,325 B1 | 11/2002 | Knauff |
| 6,480,104 B1 | 11/2002 | Wall et al. |
| 6,517,098 B2 | 2/2003 | Grasso et al. |
| 6,540,247 B1 | 4/2003 | Perkins |
| 6,585,281 B1 | 7/2003 | Voorting |
| 6,612,603 B2 | 9/2003 | Alger |
| 6,619,685 B2 | 9/2003 | Teague |
| 6,637,718 B2 | 10/2003 | Wilson |
| 6,644,680 B1 | 11/2003 | Coe |
| 6,651,996 B1 | 11/2003 | Allemang |
| 6,663,133 B1 | 12/2003 | Rosenlund |
| 6,698,783 B1 | 3/2004 | Zechbauer |
| 6,712,378 B1 | 3/2004 | Austin |
| 6,726,236 B2 | 4/2004 | Cofer |
| 6,749,213 B2 | 6/2004 | Kollath et al. |
| 6,758,485 B1 | 7/2004 | Voelker et al. |
| 6,796,573 B2 | 9/2004 | Beaudoin |
| 6,811,175 B1 | 11/2004 | Keyser |
| 6,820,888 B1 | 11/2004 | Griffin |
| 6,824,156 B2 | 11/2004 | Smith |
| 6,827,363 B1 | 12/2004 | Amerson |
| 6,834,878 B2 | 12/2004 | Koestler |
| 6,851,697 B2 | 2/2005 | Kinnard |
| 6,860,502 B1 | 3/2005 | Bolten |
| 6,863,294 B1 | 3/2005 | Bonham |
| 6,874,804 B2 | 4/2005 | Reese et al. |
| 6,880,849 B2 | 4/2005 | Teague |
| 6,889,994 B1 | 5/2005 | Birkenbaugh |
| 6,900,724 B2 | 5/2005 | Johnson |
| 6,905,132 B2 | 6/2005 | Pierce |
| 6,916,109 B2 | 7/2005 | Julicher |
| 6,932,374 B1 | 8/2005 | Timms et al. |
| 6,948,733 B2 | 9/2005 | Webster et al. |
| 6,951,345 B2 | 10/2005 | Wilks |
| 6,976,694 B1 | 12/2005 | Rayl et al. |
| 7,004,488 B2 | 2/2006 | Reiter et al. |
| 7,007,967 B2 | 3/2006 | Goettker |
| 7,036,840 B2 | 5/2006 | Kwilinski |
| 7,097,193 B1 | 8/2006 | Sievert |
| 7,111,863 B2 | 9/2006 | Ward et al. |
| 7,131,658 B2 | 11/2006 | MacKarvich |
| 7,134,679 B2 | 11/2006 | Krstovic |
| 7,192,047 B2 | 3/2007 | Sauermann |
| 7,207,589 B2 | 4/2007 | Givens |
| 7,226,070 B1 | 6/2007 | Duncan |
| 7,232,145 B2 | 6/2007 | Reece et al. |
| 7,255,362 B2 | 8/2007 | Smith |
| 7,264,260 B2 | 9/2007 | Overstreet |
| 7,290,755 B1 | 11/2007 | Thibodeaux |
| 7,293,791 B1 | 11/2007 | Williams, Jr. |
| 7,309,076 B1 | 12/2007 | Allen |
| 7,350,798 B1 | 4/2008 | Farrugia |
| 7,391,303 B2 | 6/2008 | Ball |
| 7,416,205 B1 | 8/2008 | Sam |
| 7,425,014 B1 | 9/2008 | Palmer |
| 7,431,318 B1 | 10/2008 | Frades |
| 7,451,996 B2 | 11/2008 | Miles et al. |
| 7,461,855 B2 | 12/2008 | Klar |

(56) References Cited

U.S. PATENT DOCUMENTS

| | | |
|---|---|---|
| 7,503,572 B2 | 3/2009 | Park et al. |
| 7,568,716 B2 | 8/2009 | Dietz |
| 7,571,922 B2 | 8/2009 | Pratchler |
| 7,584,983 B2 | 9/2009 | McKenney |
| 7,584,984 B1 | 9/2009 | Williams, Jr. |
| 7,621,554 B1 | 11/2009 | Cremer |
| 7,669,876 B2 | 3/2010 | Kerpash, Sr. |
| 7,690,670 B1 | 4/2010 | Lincul |
| 7,690,671 B1 | 4/2010 | Jensen |
| 7,719,409 B1 | 5/2010 | Jones |
| 7,726,679 B2 | 6/2010 | Leuermann |
| 7,744,109 B2 | 6/2010 | Groh |
| 7,744,110 B1 | 6/2010 | Ramon |
| 7,753,393 B2 | 7/2010 | Young |
| 7,766,362 B1 | 8/2010 | Helton et al. |
| 7,770,870 B1 | 8/2010 | Fly |
| 7,780,323 B2 | 8/2010 | Nolle |
| 7,793,967 B2 | 9/2010 | McConnell |
| 7,850,191 B1 | 12/2010 | Kaminski et al. |
| 7,850,192 B2 | 12/2010 | Ceccarelli et al. |
| 7,909,350 B1 | 3/2011 | Landry |
| 8,047,559 B2 | 11/2011 | Harlin |
| 8,100,428 B2 | 1/2012 | McConnell |
| 8,302,987 B2 * | 11/2012 | Williams et al. ........... 280/479.3 |
| 2001/0030409 A1 | 10/2001 | Williams |
| 2002/0003342 A1 | 1/2002 | Slatten |
| 2002/0005625 A1 | 1/2002 | Palmer |
| 2002/0008364 A1 | 1/2002 | Kahlstorf |
| 2002/0024195 A1 | 2/2002 | Heller |
| 2002/0056971 A1 | 5/2002 | Grasso et al. |
| 2002/0070529 A1 | 6/2002 | Dravecz |
| 2002/0089148 A1 | 7/2002 | Glass |
| 2002/0101055 A1 | 8/2002 | Warren |
| 2002/0105162 A1 | 8/2002 | Green |
| 2002/0117831 A1 | 8/2002 | Ahlquist et al. |
| 2002/0145268 A1 | 10/2002 | Zechbauer |
| 2002/0145269 A1 | 10/2002 | Carty |
| 2002/0189525 A1 | 12/2002 | Nathan |
| 2002/0195794 A1 | 12/2002 | Chumley |
| 2003/0011168 A1 | 1/2003 | Svensson |
| 2003/0030247 A1 | 2/2003 | Teague |
| 2003/0042707 A1 | 3/2003 | McCarty |
| 2003/0047909 A1 | 3/2003 | Alger |
| 2003/0051654 A1 | 3/2003 | Jarosek et al. |
| 2003/0075898 A1 | 4/2003 | Perkins |
| 2003/0080263 A1 | 5/2003 | McCoy |
| 2003/0094785 A1 | 5/2003 | Woods |
| 2003/0178809 A1 | 9/2003 | Anderson |
| 2003/0178810 A1 | 9/2003 | Reiter et al. |
| 2003/0209880 A1 | 11/2003 | Koestler |
| 2003/0218313 A1 | 11/2003 | Beaudoin |
| 2003/0222427 A1 | 12/2003 | Wolters et al. |
| 2004/0017060 A1 | 1/2004 | Kinnard |
| 2004/0032112 A1 | 2/2004 | Reese et al. |
| 2004/0084876 A1 | 5/2004 | Losee |
| 2004/0094934 A1 | 5/2004 | Teague |
| 2004/0108685 A1 | 6/2004 | Pierce |
| 2004/0207176 A1 | 10/2004 | Webster et al. |
| 2004/0212175 A1 | 10/2004 | Jarosek |
| 2004/0217576 A1 | 11/2004 | Fox |
| 2004/0251659 A1 | 12/2004 | Amerson |
| 2005/0087955 A1 | 4/2005 | Kellogg |
| 2005/0121879 A1 | 6/2005 | Smith |
| 2005/0134020 A1 | 6/2005 | Wilks |
| 2005/0194761 A1 | 9/2005 | Givens |
| 2005/0218626 A1 | 10/2005 | Kwilinski |
| 2005/0230935 A1 | 10/2005 | Sauermann |
| 2006/0076755 A1 | 4/2006 | Bergeron |
| 2006/0097480 A1 | 5/2006 | Hegefeld |
| 2006/0097481 A1 | 5/2006 | Nicholas |
| 2006/0208455 A1 | 9/2006 | MacKarvich |
| 2006/0220345 A1 | 10/2006 | Schmidt |
| 2006/0255560 A1 | 11/2006 | Dietz |
| 2006/0273549 A1 | 12/2006 | Dietz |
| 2007/0007748 A1 | 1/2007 | Hancock |
| 2007/0029757 A1 | 2/2007 | Leuermann |
| 2007/0080516 A1 | 4/2007 | Simmons |
| 2007/0108731 A1 | 5/2007 | McBroom |
| 2007/0114760 A1 | 5/2007 | Hegefeld |
| 2007/0205580 A1 | 9/2007 | Hamilton et al. |
| 2007/0205581 A1 | 9/2007 | Wilcox |
| 2007/0216135 A1 | 9/2007 | Rebick et al. |
| 2007/0216136 A1 | 9/2007 | Dietz |
| 2007/0241535 A1 | 10/2007 | Salyers |
| 2007/0252359 A1 | 11/2007 | Wishart et al. |
| 2008/0036177 A1 | 2/2008 | McKenney |
| 2008/0073872 A1 | 3/2008 | Scott |
| 2008/0179861 A1 | 7/2008 | Columbia |
| 2008/0197606 A1 | 8/2008 | Capuano |
| 2008/0217885 A1 | 9/2008 | Woolever et al. |
| 2008/0246254 A1 | 10/2008 | Tyerman |
| 2008/0277903 A1 | 11/2008 | Anderson et al. |
| 2009/0014982 A1 | 1/2009 | Wulff |
| 2009/0033061 A1 | 2/2009 | Hensley |
| 2009/0045604 A1 | 2/2009 | Bernart |
| 2009/0057633 A1 | 3/2009 | Beck et al. |
| 2009/0072516 A1 | 3/2009 | Kuenzel |
| 2009/0108563 A1 | 4/2009 | Groh |
| 2009/0127824 A1 | 5/2009 | Young |
| 2009/0127825 A1 | 5/2009 | Drake et al. |
| 2009/0146393 A1 | 6/2009 | Hawkins et al. |
| 2009/0189368 A1 | 7/2009 | Smith |
| 2009/0194969 A1 | 8/2009 | Bearey |
| 2009/0295123 A1 | 12/2009 | Good |
| 2010/0038882 A1 | 2/2010 | Chimento et al. |
| 2010/0109286 A1 | 5/2010 | Visser |
| 2010/0117332 A1 | 5/2010 | Harlin |
| 2010/0117333 A1 * | 5/2010 | Ceccarelli et al. ......... 280/479.3 |
| 2010/0140900 A1 | 6/2010 | Zinn |
| 2010/0187489 A1 | 7/2010 | Herbert |
| 2010/0187793 A1 | 7/2010 | O'Quinn |
| 2010/0201100 A1 | 8/2010 | Hill |
| 2010/0264626 A1 | 10/2010 | Morehead |
| 2010/0289249 A1 | 11/2010 | McConnell |
| 2010/0314853 A1 | 12/2010 | Mallory |

OTHER PUBLICATIONS

International Preliminary Report on Patentability Corresponding to International Application No. PCT/US2010/057968; Date of Mailing: Sep. 20, 2012; 7 Pages.

* cited by examiner

HITCH APPARATUS FOR VEHICLES

RELATED APPLICATION

This application claims the benefit of and priority to U.S. Provisional Patent Application No. 61/312,056 filed Mar. 9, 2010, the disclosure of which is incorporated herein by reference as if set forth in its entireties.

FIELD OF THE INVENTION

The present invention relates generally to vehicle towing and, more particularly, to hitch assemblies for towing vehicles.

BACKGROUND

Powered and trailed vehicles are conventionally interconnected for travel by coupling hitches involving fixed locations on the vehicles. Using ball and socket-type universal connections or pin-type connections, the required relative movement during travel is provided. The fixed locations, however, may be difficult to effect, particularly with large vehicles that prevent ready manual alignment for final coupling. When accurate alignment is not obtained, conventionally the towed vehicle is manually moved to proper position, which may require strength, dexterity and multiple personnel, often with an attendant risk of injury. As the tongue weight of a towed vehicle increases, the skill required and risk associated with coupling the towed vehicle to a towing vehicle may be substantially increased. The problem may be particularly troublesome for large steerable wheel trailers, such as those employed by the military.

Telescoping and pivoting hitches have been proposed to allow coupling between misaligned vehicles. Most are designed for lighter weight trailers and unsuited for heavy load applications. Others provide only a length-dependent articulation reducing the accommodated zone of vehicle misalignment.

After market trailer hitch systems have been available for some time for vehicles such as pickup trucks. These systems conventionally are mounted to a truck frame using brackets that can be coupled to the frame of a truck. Unfortunately, the truck bumper is often required to be removed, and a replacement bumper, typically of universal application, is installed with the hitch assembly. For cost reasons and aesthetic reasons, many vehicle owners do not want to replace their bumpers when installing a trailer hitch.

In addition, the mounting structures of some after market trailer hitch systems utilize transverse structural members that may interfere with the spare tire storage location of many conventional pickup trucks, and may inhibit removal of a spare tire from the storage location. As such, these devices may require the spare tire to be removed and relocated to another area of the vehicle. For various reasons including convenience, vehicle owners may not want to have to relocate a spare tire to another vehicle location.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a hitch apparatus includes a housing configured to be attached to a vehicle, and a tow bar movably disposed within the housing. The tow bar is movable relative to the housing between a fully retracted position and a plurality of extended positions. The tow bar is pivotable relative to the housing when in any of the extended positions. The housing includes spaced-apart first and second sections that define a cavity. The first and second sections each have an elongated slot formed therethrough. A pair of guide members extend outwardly from respective opposite sides of the tow bar at a proximal end of the tow bar, and each guide member is operably engaged with the slot in a respective one of the first and second sections. In some embodiments, one or both of the guide members are rollers that are configured to rotate as the tow bar is extended and retracted.

In some embodiments of the present invention, the housing includes a pair of tow bar guide doors pivotally secured between the first and second sections. Each door is movable between closed and open positions. The tow bar guide doors limit the extent to which the tow bar can pivot, and guide the tow bar as it is retracted into the housing. The tow bar guide doors also allow the tow bar to pivot when in the fully retracted position within the housing. The tow bar guide doors allow the extent to which the tow bar can pivot to progressively increase as the tow bar is progressively extended. In some embodiments of the present invention, a biasing element, such as a spring, is utilized to urge each tow bar guide door to a closed position.

In other embodiments of the present invention, the housing includes a pair of guide posts extending between the first and second sections to form a restricted opening through which the tow bar extends. The tow bar includes comprises a pair of tow bar guide wings, each extending outwardly from an opposite side portion of the tow bar. Each tow bar guide wing is configured to contact a respective guide post such that an extent to which the tow bar can pivot relative to the housing progressively increases as the tow bar is progressively extended. Cooperation of the guide posts and the tow bar guide wings also guide the tow bar into the housing as the tow bar is retracted. In some embodiments, each tow bar guide wing has an outwardly diverging curvilinear edge portion that cooperates with a respective guide post when the tow bar is pivoted. Each guide post may also include a bearing surface that contacts a respective tow bar guide wing edge portion.

In some embodiments of the present invention, a first bearing member is attached to an interior side of the first section, and a second bearing member is attached to an interior side of the second section. Each bearing member has an elongated slot formed therethrough that is aligned with a respective elongated slot in one of the first and second sections. The tow bar is in contacting relationship with the first and second bearing members as the tow bar is moved between retracted and extended positions.

The hitch apparatus also includes a locking mechanism that is operably secured to the housing and that releasably engages the tow bar to maintain the tow bar in a retracted position. In some embodiments, the locking mechanism includes a locking member configured to block movement of one of the guide members when the tow bar is in a fully retracted position.

According to other embodiments of the present invention, a locking mechanism is operably secured to a rear portion of the housing and includes a latching member rotatably mounted to the housing. The latching member includes a recess open to receive a rod secured to the tow bar adjacent the proximal end thereof. The latching member rotates between an open rod receiving position and a closed rod retaining position holding the tow bar in the retracted position. A handle is operably connected to the latching member. In response to user activation of the handle, the latching member rotates and releases the rod, thereby allowing the tow bar to be extended.

In some embodiments of the present invention, the latching member comprises a portion that engages the rod and urges the tow bar to an extended position when the latching member is rotated to the open rod receiving position. In other embodiments, a biasing member may be utilized to slightly urge the tow bar outwardly when the latching member is rotated to release the rod to facilitate one-hand operation.

According to some embodiments of the present invention, a hitch apparatus includes a housing configured to be attached to a vehicle, and a tow bar movably disposed within the housing. The tow bar is movable relative to the housing between a fully retracted position and a plurality of extended positions. The tow bar is pivotable relative to the housing. The housing includes spaced-apart first and second sections that define a cavity, and a pair of side walls sandwiched between the first and second sections in spaced-apart relationship. Each side wall has an elongated slot formed therethrough. A guide member extends outwardly from a proximal end of the tow bar and is operably engaged with the slots in the side walls to limit an extent to which the tow bar can be extended.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

DETAILED DESCRIPTION

Figure 1:
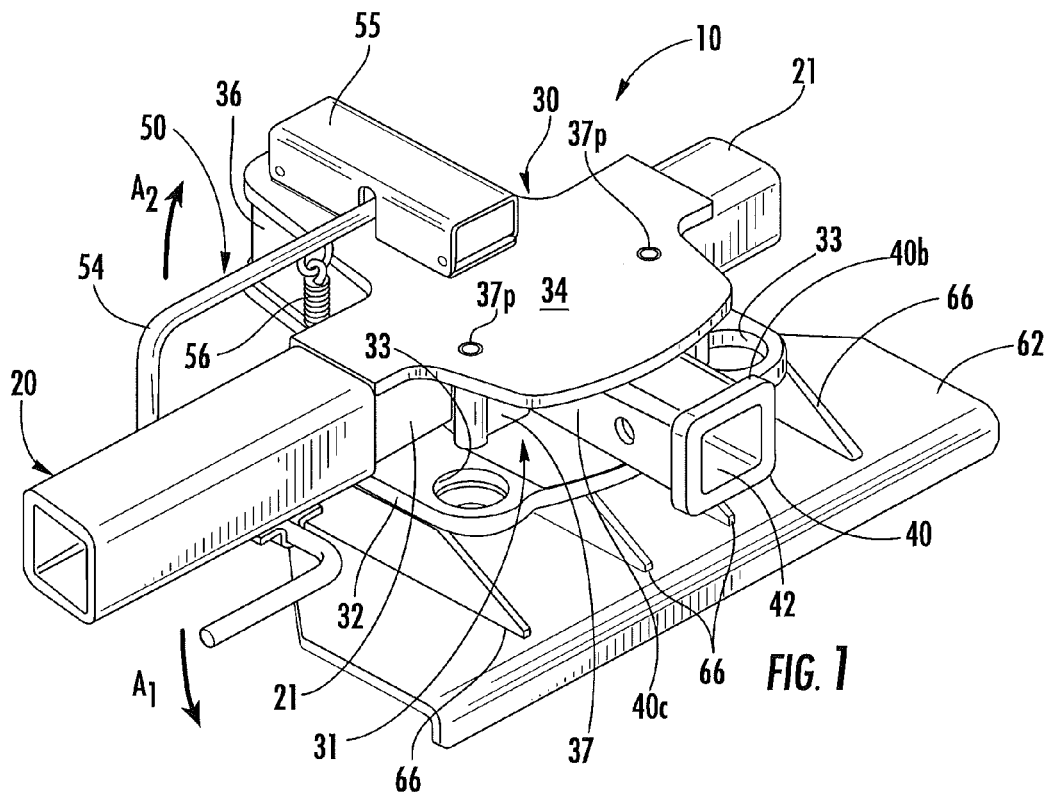
FIG. 1 is a top perspective view of a hitch apparatus, according to some embodiments of the present invention.
Figure 2:
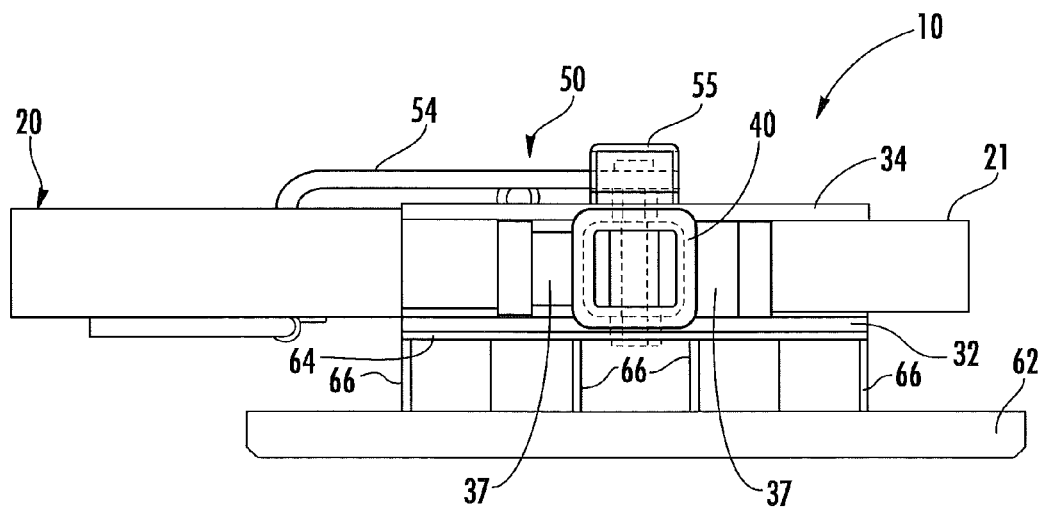
FIG. 2 is a front elevation view of the hitch apparatus of FIG. 1.
Figure 3:
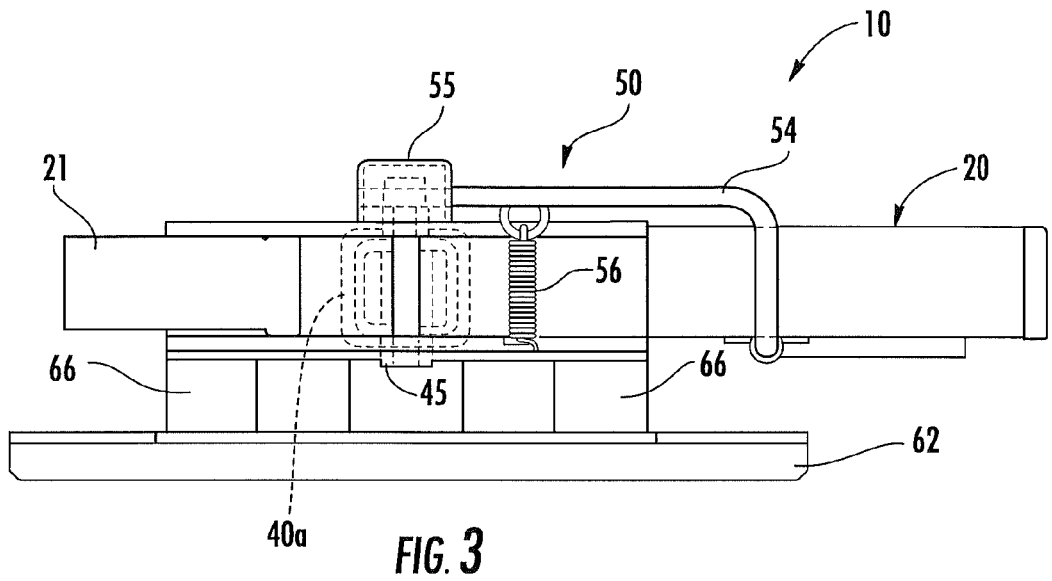
FIG. 3 is a rear elevation view of the hitch apparatus of FIG. 1.
Figure 4:
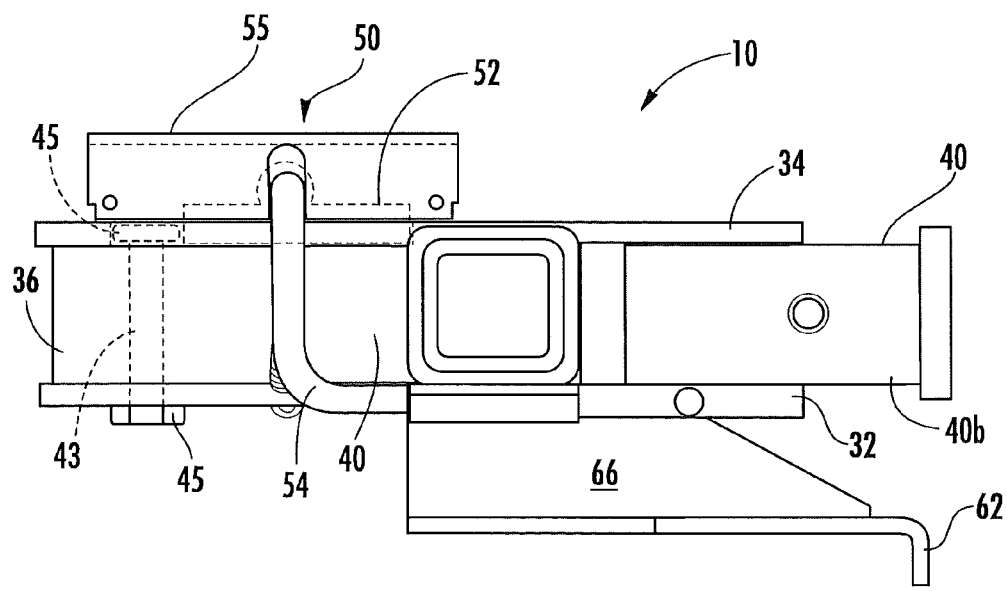
FIG. 4 is a side elevation view of the hitch apparatus of FIG. 1.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "vehicle" includes all types of vehicles including, but not limited to, automobiles, trucks, military vehicles, airplanes, trains, etc., and also includes towed vehicles and towing vehicles.

Referring now to FIGS. 1-7, a hitch apparatus 10, according to some embodiments of the present invention, is illustrated. The hitch apparatus 10 is configured to be installed on a vehicle and, in some embodiments, is utilized with a frame 20 that is mounted to a chassis/frame and/or underside of a vehicle. In the illustrated embodiment, the frame 20 is only partially shown on one side of the housing 30 for clarity. Also, in the illustrated embodiment, a pair of arms 21 extend from respective sides of the housing 30 and are configured to be inserted within and secured to a respective tubular frame member (e.g., via welding, fasteners, or a combination of welding and fasteners), as would be understood by those skilled in the art. However, embodiments of the present invention are not limited to the illustrated configuration of arms 21. In some embodiments, housing 30 does not include arms 21 and a frame is directly secured to the housing 30, for example via welding, fasteners, or a combination of welding and fasteners.

Moreover, a frame, if utilized with the illustrated hitch apparatus 10, can have various configurations and shapes to facilitate mounting of the hitch apparatus 10 to the underside or other portion of a particular vehicle. Furthermore, the hitch apparatus 10, according to some embodiments of the present invention, can be mounted to a vehicle without the use of a frame.

The illustrated hitch apparatus 10 includes a housing 30 and a tow bar 40 movably disposed within the housing 30. The housing 30 defines a longitudinally extending forwardly opening cavity 31. The illustrated tow bar 40 is a tubular member having a proximal end portion 40a and a distal end portion 40b connected by a center or medial portion 40c. The tow bar distal end portion 40b includes an opening 42 that is configured to receive a coupling apparatus, such as a tow ball, pintle clip, pintle hook, lunette ring, clevis pin device, etc. In some embodiments, the tow bar distal end portion 40b may include a coupling apparatus integrally formed therewith.

Embodiments of the present invention are not limited to the illustrated tubular configuration of the tow bar 40. Other configurations may be utilized. For example, in some embodiments, the tow bar 40 may have other tubular cross-sectional shapes. In other embodiments, the tow bar 40 may be a solid member or plate. The tow bar 40 can be formed from various materials known to those skilled in the art. An exemplary material includes, but is not limited to, case-hardened steel.

The tow bar 40 is movable relative to the housing 30 between retracted and extended positions, and is pivotable relative to the housing 30 when in extended positions and in the fully retracted position. The illustrated hitch apparatus housing 30 is defined by a lower section 32, an upper section 34, and an arcuate member 36 sandwiched between the upper section 34 and lower section 32 to form a peripheral wall of the housing 30. In some embodiments, the lower section 32, upper section 34 and arcuate member 36 are welded together. In other embodiments, fasteners (e.g., bolts, screws, threaded rods, rivets, etc.) may be utilized to secure the lower section 32, upper section 34 and arcuate member 36 together. In some embodiments, a combination of fasteners and welding may be utilized, as would be understood by those skilled in the art.

The illustrated housing 30 also includes a pair of tow bar guide doors 37 pivotally secured between the lower and upper sections 32, 34 and movable between closed and open positions. In the illustrated embodiment, each tow bar guide door 37 is pivotally secured to the housing 30 via a respective pin 37p that is secured at opposite ends to the lower and upper sections 32, 34. Each door 37 rotates about a respective pin 37p between the closed and open positions. In some embodiments, a biasing mechanism may be utilized with the pin 37p to urge a respective tow bar guide door 37 to a closed position. As will be described below, tow bar guide doors 37 limit the extent to which the tow bar 40 can be pivoted in extended positions and also guide the tow bar 40 as it is being retracted into the housing 30. The tow bar guide doors 37 also allow the tow bar 40 to pivot when in the fully retracted position.

Figure 7:
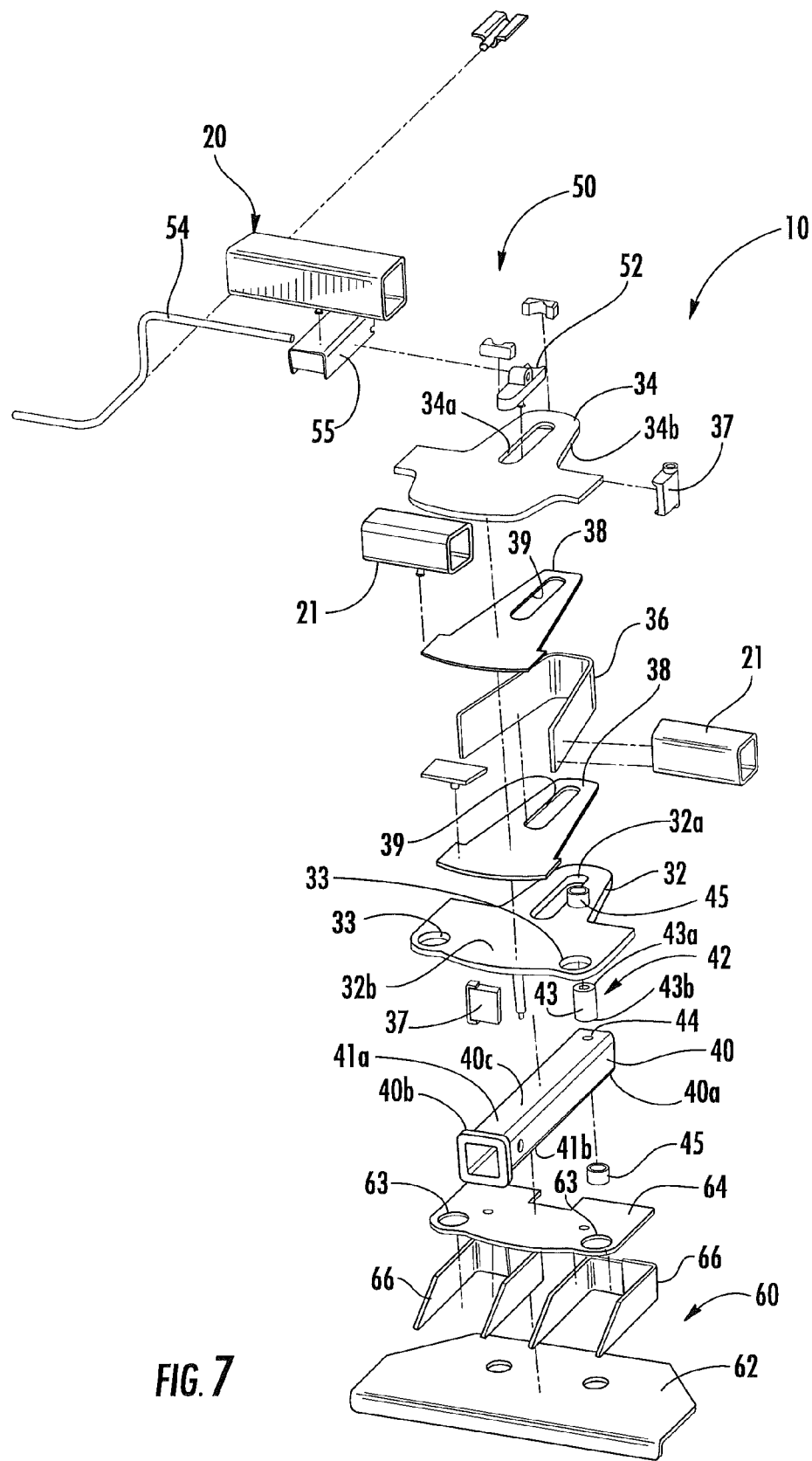
FIG. 7 is an exploded perspective view of the hitch apparatus of FIG. 1.

As illustrated best in FIG. 7, the upper section 34 and lower section 32 each have a respective slot 34a, 32a formed therein. As will be described below, each slot 34a, 32a receives a respective guide member 45 that is attached to the tow bar 40 via rod 43. The cooperation of each guide member 45 with a respective slot 34a, 32a controls the extent to which the tow bar 40 can be extended, relative to the housing 30. In the illustrated embodiment, the lower section 32 includes a pair of apertures 33 formed therethrough for receiving a hook of a safety chain attached to a trailer or other towed vehicle, as would be understood by those skilled in the art.

Embodiments of the present invention are not limited to the illustrated shape and configuration of the upper section 34, lower section 32, an arcuate member 36. Various shapes and configurations for these elements may be utilized, without limitation. Furthermore, although illustrated as plate members with generally planar configurations, one or both of the upper and lower sections 34, 32 may have one or more portions with a non-planar configuration. The upper and lower sections 34, 32 and arcuate member 36 can be formed from various materials known to those skilled in the art. An exemplary material includes, but is not limited to, case-hardened steel.

In the illustrated embodiment, an accessory platform assembly 60 is secured to the lower section 32 and may be configured to have various functions. For example, in some embodiments, the accessory platform assembly 60 may be utilized as a step to facilitate user ingress and egress into and from a vehicle to which the hitch apparatus 10 is attached. In other embodiments, the accessory platform assembly 60 may be utilized to support a bike rack or other apparatus for carrying items. In some embodiments, the accessory platform 60 may also provide structural rigidity to the housing 30 and protect the housing 30 from impacts from objects over which a vehicle may pass during vehicle operation.

The illustrated accessory platform assembly 60 includes an upper member 64, a lower member 62, and rib members 66 sandwiched between the upper and lower members 64, 62. In some embodiments, the upper member 64, lower member 62, and rib members 66 are welded together. In other embodiments, fasteners (e.g., bolts, screws, threaded rods, rivets, etc.) may be utilized to secure the upper member 64, lower member 62, and rib members 66 together. In some embodiments, a combination of fasteners and welding may be utilized, as would be understood by those skilled in the art. Moreover, the illustrated accessory platform assembly 60 may be secured to the housing lower section 32 via welding, fasteners, or a combination of welding and fasteners.

The upper member 64, lower member 62, and rib members 66 can have virtually any shape or configuration. Embodiments of the present invention are not limited to the illustrated configuration of the various components of the accessory platform assembly 60. Moreover, in some embodiments of the present invention, the accessory platform assembly 60 is not utilized at all. The upper member 64, lower member 62, and rib members 66 can be formed from various materials known to those skilled in the art. An exemplary material includes, but is not limited to, case-hardened steel. In other embodiments of the present invention, the accessory platform assembly 60 may be secured to the upper section 34 of the hitch apparatus housing 30. In some embodiments of the present invention, a plate or other type of structural member may be attached to the housing upper section 34 and serve as a step to facilitate user ingress and egress into and from a vehicle.

In the illustrated embodiment, the upper member 64 of the accessory platform assembly 60 includes a pair of apertures 63 formed therethrough. When the accessory platform assembly 60 is attached to the housing lower section 32, the upper member apertures 63 align with the apertures 33 in the lower section 32.

The tow bar 40 includes a guide pin assembly 42 at the proximal end portion 40a of the tow bar 40. The guide pin assembly 42 includes a rod or other type of rigid connection member 43 that extends through and is secured to the tow bar 40. In the illustrated embodiment, the rod 43 extends through respective apertures 44 formed in the upper and lower sides 41a, 41b of the tow bar 40 (FIG. 7). A guide member 45 is secured to each end portion 43a, 43b of the rod 43 extending from respective upper and lower sides 41a, 41b of the tow bar 40 at the proximal end 40a thereof. The guide members 45 are configured to be engaged with respective slots 32a, 34a in the lower and upper sections 32, 34 so as to limit the travel distance of the tow bar 40 as it is extended from the housing 30. The cooperation of the guide members 45 and respective slots 32a, 34a, in conjunction with the tow bar guide doors 37, allows the tow bar 40 to pivot relative to the housing 30 as the tow bar 40 is extended from the housing 30. The cooperation of the guide members 45 and respective slots 32a, 34a, in conjunction with the tow bar guide doors 37, also serves the function of guiding the tow bar 40 as it is being retracted into the housing 30.

In some embodiments, one or both of the guide members 45 are rollers, such as steel rollers, and are rotatably secured to respective ends of the rod 43. Rotation of the guide members 45 within the respective slots 34a, 32a in the upper and lower sections 32 can facilitate smooth operation of the tow bar 40 as it is extended and retracted relative to the housing 30. However, in other embodiments, one or more of the guide members 45 may be non-rotatable. In some embodiments, one or more of the guide members 45 may comprise a bearing material or other low friction material that facilitates movement of the guide members 45 within the elongated slots 32a, 34a.

In the illustrated embodiment, the bottom surface 34b of the upper section 34 includes a bearing member 38 attached thereto and the upper surface 32b of the lower section 32 includes a bearing member 38 attached thereto. The bearing members 38 are in contact with the tow bar 40 and facilitate sliding of the tow bar 40 as it is being extended and retracted. In the illustrated embodiment, each bearing member 38 includes a respective slot 39 that allows a respective guide member 45 to extend therethrough so as to cooperate with respective slots 34a, 32a in the upper section 34 and lower section 32.

Each bearing member 38 has an elongated, planar configuration. However, embodiments of the present invention are not limited to the illustrated shape of the bearing members 38. The bearing members 38 may have various shapes and configurations.

In some embodiments of the present invention, each bearing member 38 is sandwiched between the tow bar 40 and a respective one of the lower and upper sections 32, 34 during assembly and maintained in place without the use of fasteners, adhesives, and/or welding. In some embodiments of the present invention, the assembly of the tow bar 40, housing upper and lower sections 34, 32, and bearing members 38 are maintained in the assembled configuration via fasteners. In other embodiments, each bearing member 38 is attached to a respective lower and upper section 32, 34 via welding and/or fasteners. In some embodiments, each bearing member 38 may be adhesively attached to a respective lower and upper section 32, 34. Also, various combinations of adhesives, welding and/or fasteners may be utilized.

In some embodiments of the present invention, one or more bearing members may be attached (e.g., adhesively attached, etc.) to the tow bar 40. In other embodiments, a sleeve of bearing material may encase the tow bar 40.

In the illustrated embodiment, each bearing member 38 may be formed from a low friction bearing material. An exemplary bearing material is NYLATRON® brand bearing material. NYLATRON® brand bearing material has numerous properties that are particularly suitable for the hitch apparatus 10. For example, NYLATRON® brand bearing material has high mechanical strength, stiffness, hardness, and toughness. In addition, NYLATRON® brand bearing material exhibits good fatigue resistance, high mechanical damping ability, good sliding properties, and good wear resistance.

However, various other types of bearing materials may be utilized, without limitation. In some embodiments, the entire bearing member 38 may be formed from a bearing material. In other embodiments, the surface of the bearing member 38 that contacts the tow bar 40 may be a coating or layer of bearing material, such as NYLATRON® brand bearing material. In some embodiments of the present invention, the bearing material may have a coefficient of friction of about 0.5 or less.

In other embodiments of the present invention, separate bearing members 38 are not utilized. Instead, a coating or layer of bearing material, such as a coating of polytetrafluoroethylene (PTFE) material or any other type of low friction material, may be applied to the lower surface 34b of upper section 34 and/or to the upper surface 32a of the lower section 32, as would be understood by those skilled in the art. In some embodiments of the present invention, a coating of PTFE material or other type of low friction material may be applied to various locations on the tow bar 40.

Figure 5:
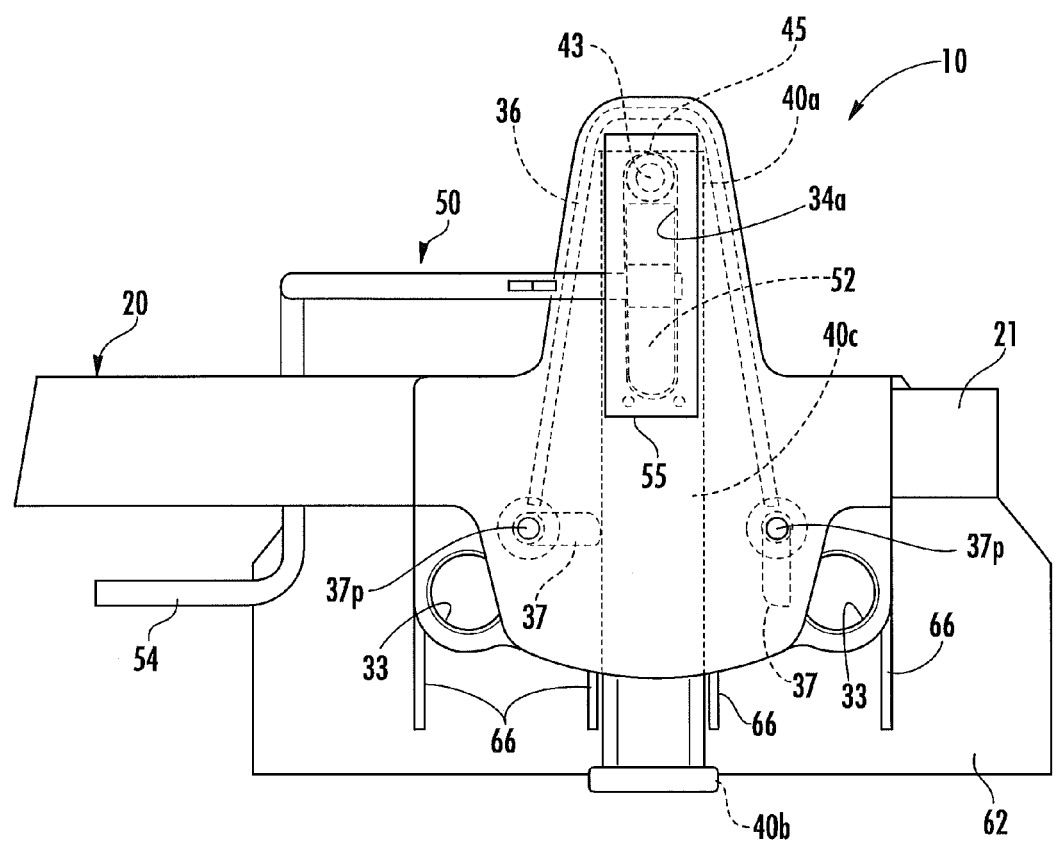
FIG. 5 is a top plan view of the hitch apparatus of FIG. 1.
Figure 6:
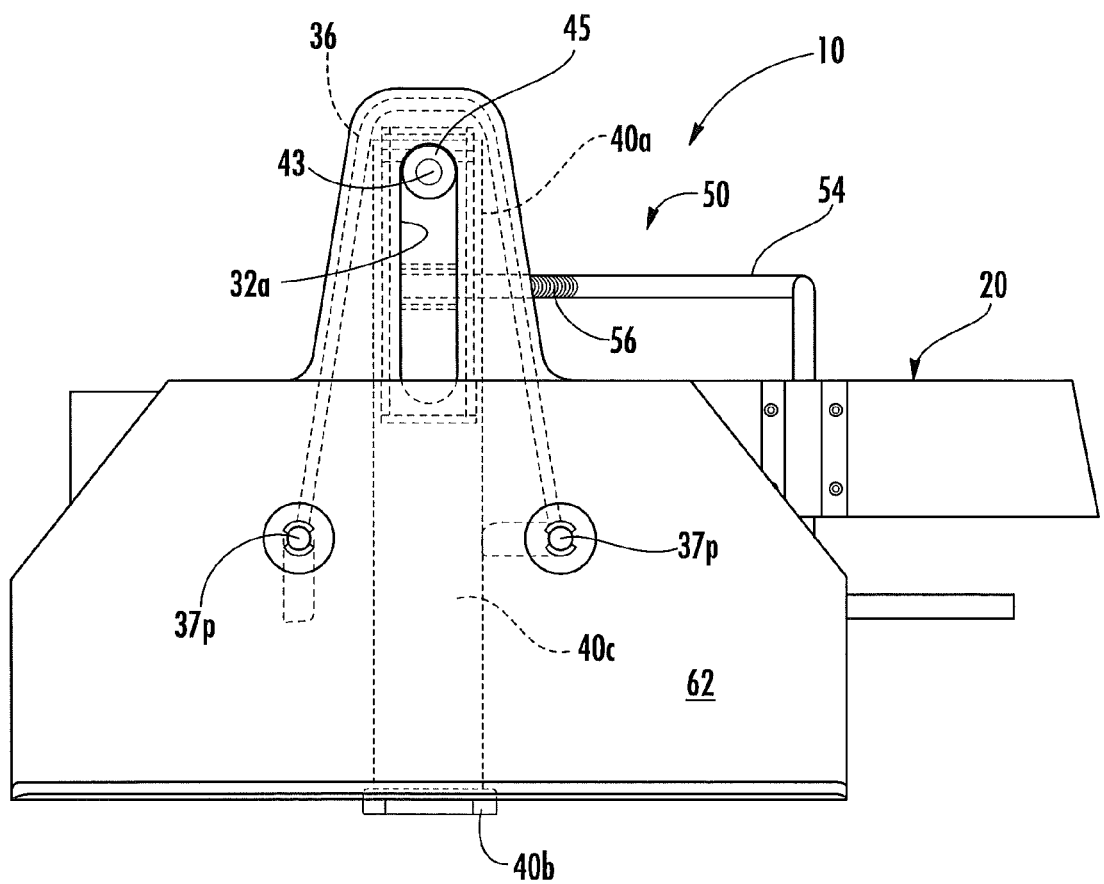
FIG. 6 is a bottom plan view of the hitch apparatus of FIG. 1.

The tow bar guide doors 37 are configured to limit the extent to which the tow bar 40 pivots as it is moved between retracted and extended positions. The tow bar guide doors 37 also allow the tow bar 40 to pivot in the fully retracted position within the housing 30. In addition, the tow bar guide doors facilitate guiding the tow bar 40 back into the housing 30 when the tow bar 40 is moved to the fully retracted position. In operation, as the tow bar 40 is moved to an extended position and pivoted, the tow bar 40 contacts a respective tow bar guide door 37. Contact of the tow bar 40 with a tow bar guide door 37 during extension of the tow bar 40 causes the tow bar guide door 37 to rotate. The extent of rotation of the tow bar guide doors 37 is illustrated in FIGS. 5 and 6. One of the tow bar guide doors 37 is in the closed position and the other tow bar guide door 37 is in the open position for illustration. In the illustrated embodiment, the total amount of rotation of each of the tow bar guide doors 37 is about ninety degrees)(90°.

In operation, both tow bar guide doors 37 are in the closed position when the tow bar 40 is fully retracted within the housing 30. In the closed position, the tow bar guide doors 37 prevent the tow bar 40 from pivotal movement relative to the housing 30. As the tow bar 40 is extended, contact with a respective tow bar guide door 37 causes the tow bar guide door 37 to pivot from its closed position. Thus, forward movement of the tow bar 40 (i.e., extension of the tow bar 40 from the housing 30) and contact with a respective tow bar guide door 37 causes the tow bar guide door 37 to pivot. A tow bar guide door 37 is in a fully open position (i.e., about 90° from the closed position) at the point where the tow bar 40 is fully extended. Embodiments of the present invention are not limited to the illustrated configuration of tow bar guide doors 37. The tow bar guide doors 37 can have various shapes and configurations, without limitation.

The illustrated tow bar guide doors 37 are also configured to be opened manually. For example, a user can pivot a tow bar guide door 37 to an open position, extend the tow bar 40 outwardly from the housing 30, and then pivot the tow bar 40 to make contact with the open tow bar guide door 37.

A locking mechanism 50 is operably secured to the frame 20 and is configured to releasably engage the tow bar 40 to maintain the tow bar 40 in a fully retracted position. The locking mechanism 50 includes a locking member 52 that releasably engages the slot 34a in the upper section 34. The locking member 52, when engaged within the slot 34a blocks movement of the guide member 45 attached to the upper end 43a of rod 43 and maintains the tow bar 40 in a fully retracted position. The locking mechanism 50 includes an elongated handle 54 that is movably secured to the frame 20 and that is configured to disengage the locking member 52 from the upper section slot 34a in response to user activation. The illustrated handle 54 is rotatably secured to the frame 20 such that downward movement of one end of the handle, as indicated by arrow $A_1$, causes the opposite end of the handle to move upwardly (indicated by arrow $A_2$). This upward movement raises the locking member 52 and disengages the locking member 52 from the tow bar slot 34a. A spring 56 is connected to the handle 54 and is configured to urge the locking member 52 downward towards the tow bar 40 and into the slot 34a. When the locking member 52 is disengaged from the slot 34a and the tow bar 40 is extended, the locking member 52 rides on top of the guide member 45 and is urged into contact with the top of the guide member 45. When the tow bar 40 is retracted to the fully retracted position, the spring 56 causes the locking member 52 to engage the slot 34a, block the guide member 45 from movement, and thereby secure the tow bar 40 in the fully retracted position and prevent movement thereof.

In the illustrated embodiment, a cover 55 is attached to the upper section 34 and overlies the locking member 52. Cover 55 is configured to prevent foreign matter from hindering operation of the locking member 52. The cover 55 also serves to limit the travel of the locking mechanism handle 54.

FIGS. 8-12 illustrate a hitch apparatus 10 according to other embodiments of the present invention. The illustrated hitch apparatus 10 is similar in configuration and operation to the hitch apparatus 10 of FIGS. 1-7 with the exception that the tow bar guide doors 37 are provided with biasing elements, such as springs 37a, that urge the tow bar guide doors 37 to the closed position. In the illustrated embodiment, each tow bar guide door 37 includes an upper arm portion 37b that is connected to a respective spring 37a. In the illustrated embodiment, a cover 37c overlies the springs 37a to protect the springs 37a. However, embodiments of the present invention do not require the cover 37c.

Embodiments of the present invention are not limited to the illustrated configuration of tow bar guide doors 37 and springs 37a. The tow bar guide doors 37 can have various shapes and configurations, without limitation. Moreover, various types of biasing elements can be utilized to urge the tow bar guide doors 37 to the closed position.

Figure 8:
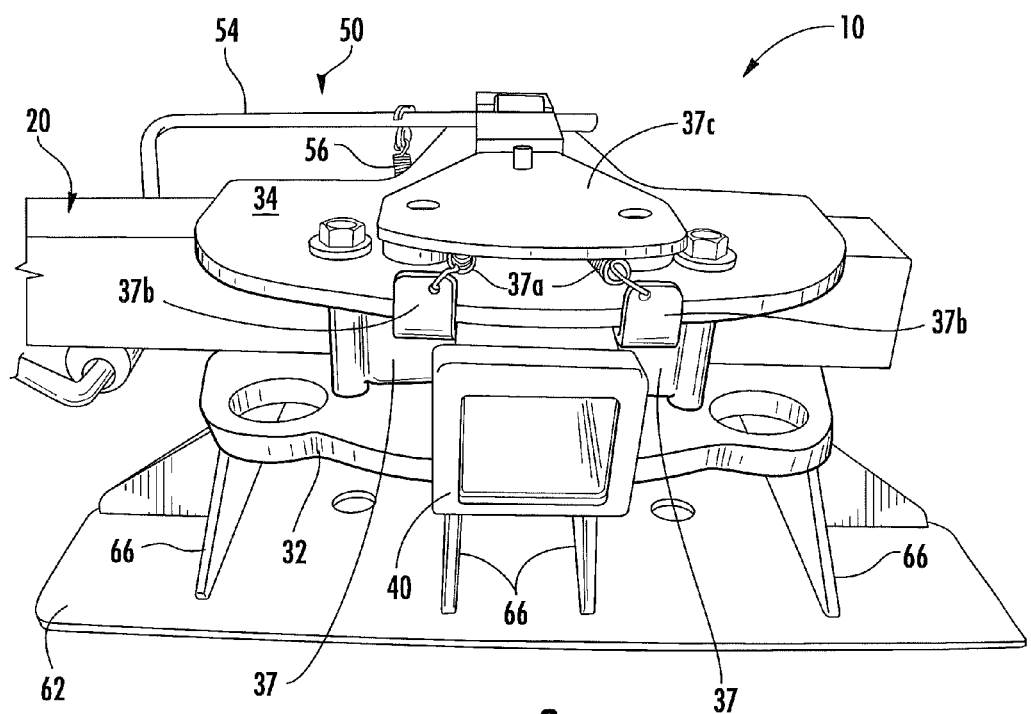
FIG. 8 is a front perspective view of a hitch apparatus, according to other embodiments of the present invention.
Figure 9:
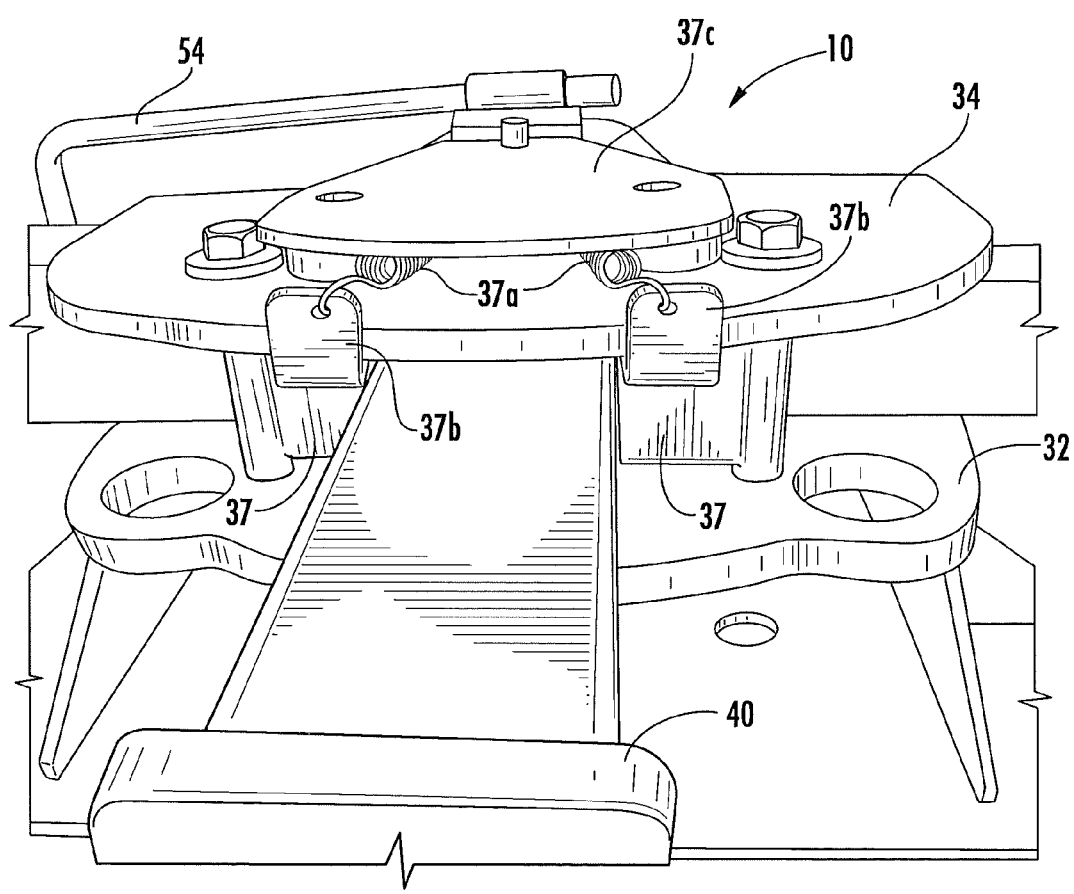
FIG. 9 illustrates the hitch apparatus of FIG. 8 with the tow bar in an extended position.
Figure 10:
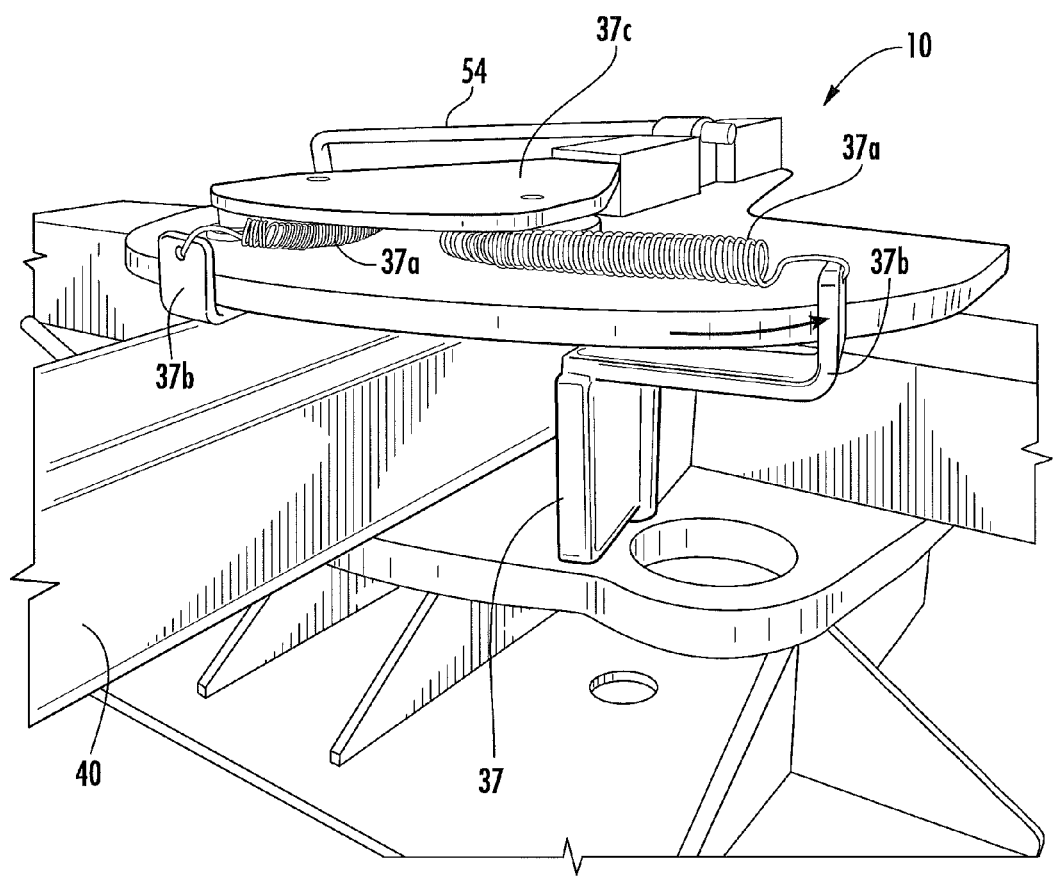
FIG. 10 is a partial side perspective view of the hitch apparatus of FIG. 8 illustrating one of the tow bar guide doors moved to an open position.
Figure 11:
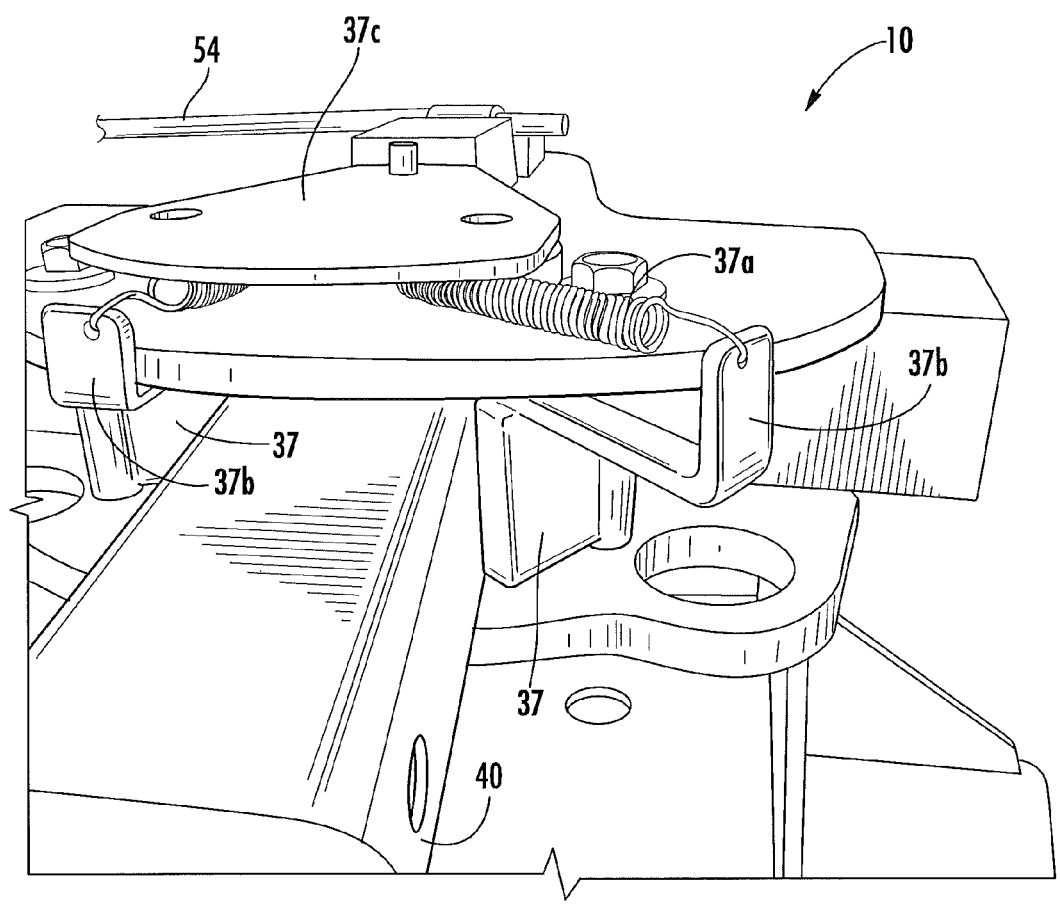
FIG. 11 is a partial top perspective view of the hitch apparatus of FIG. 8 illustrating one of the tow bar guide doors in contact with the tow bar.
Figure 12:
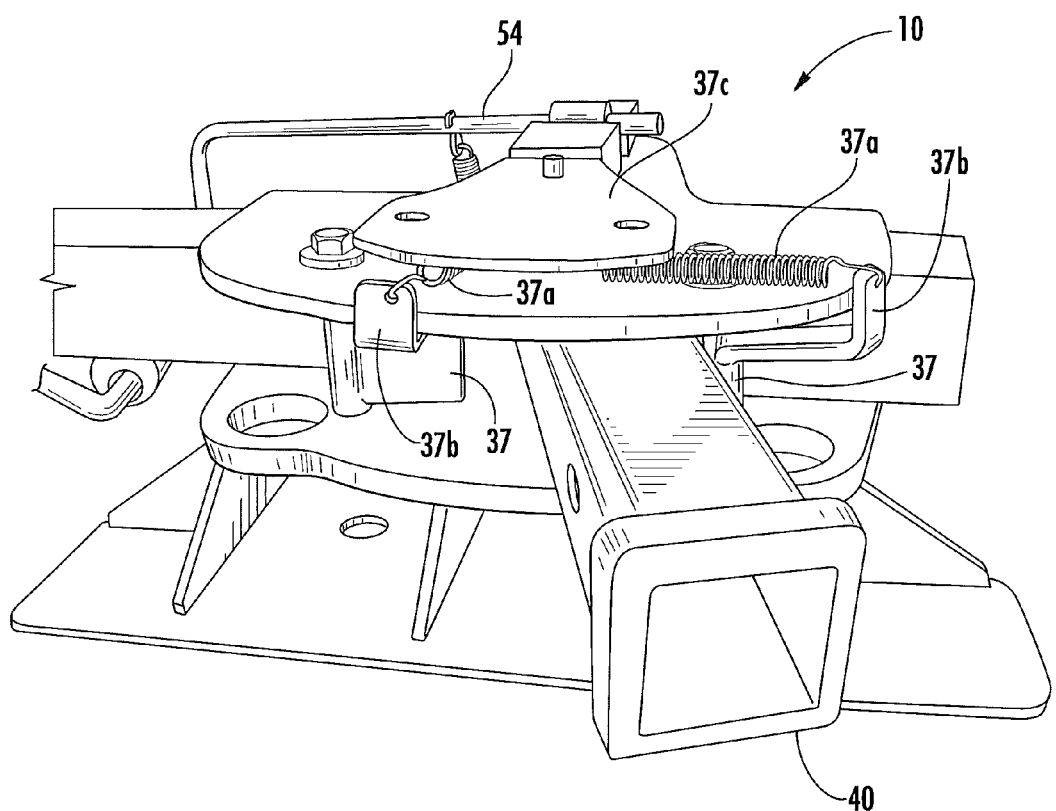
FIG. 12 is a top perspective view of the hitch apparatus of FIG. 8 with the tow bar in an extended and pivoted position.
Figure 13:
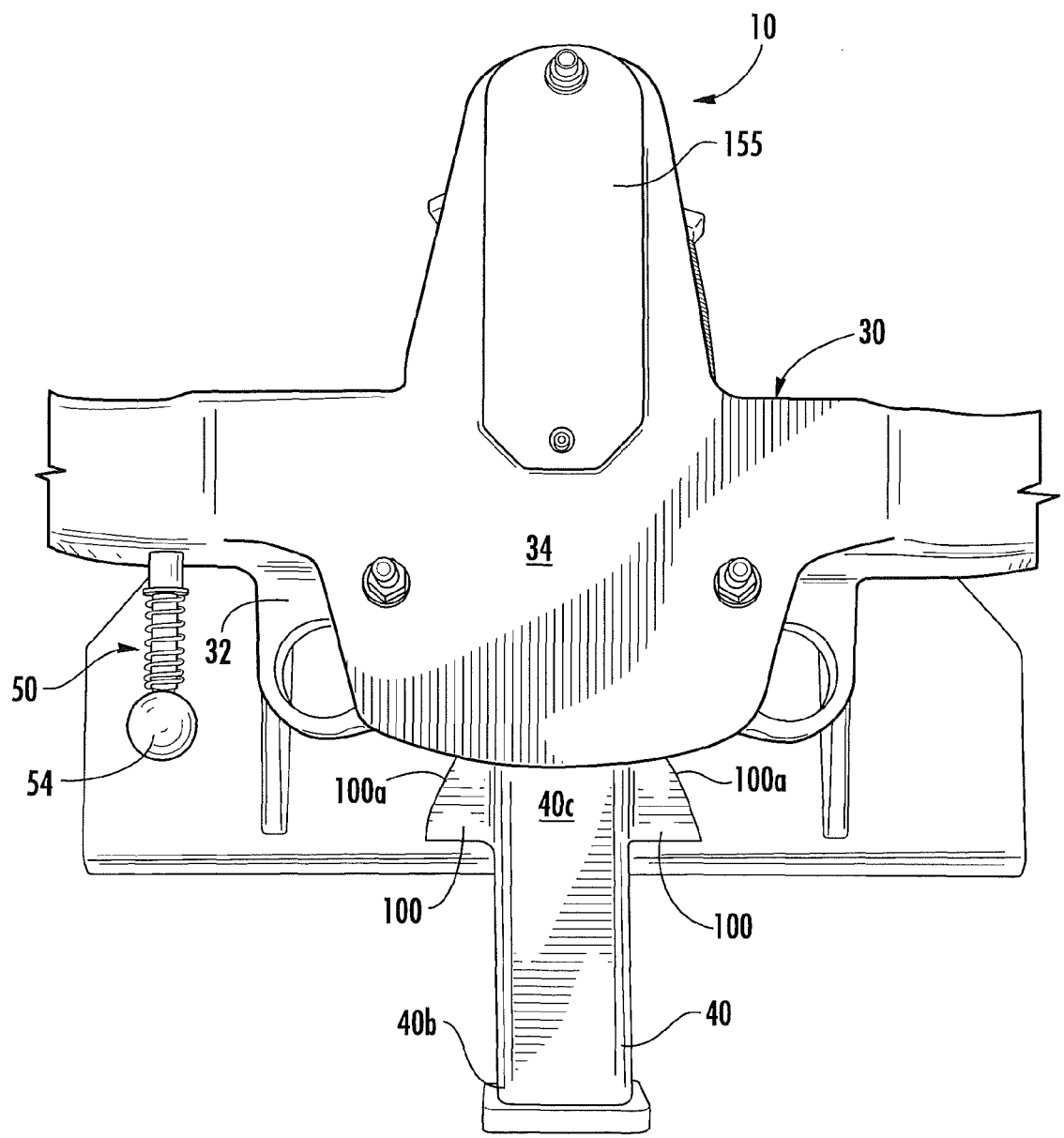
FIG. 13 is a top plan view of a hitch apparatus, according to other embodiments of the present invention.
Figure 14:
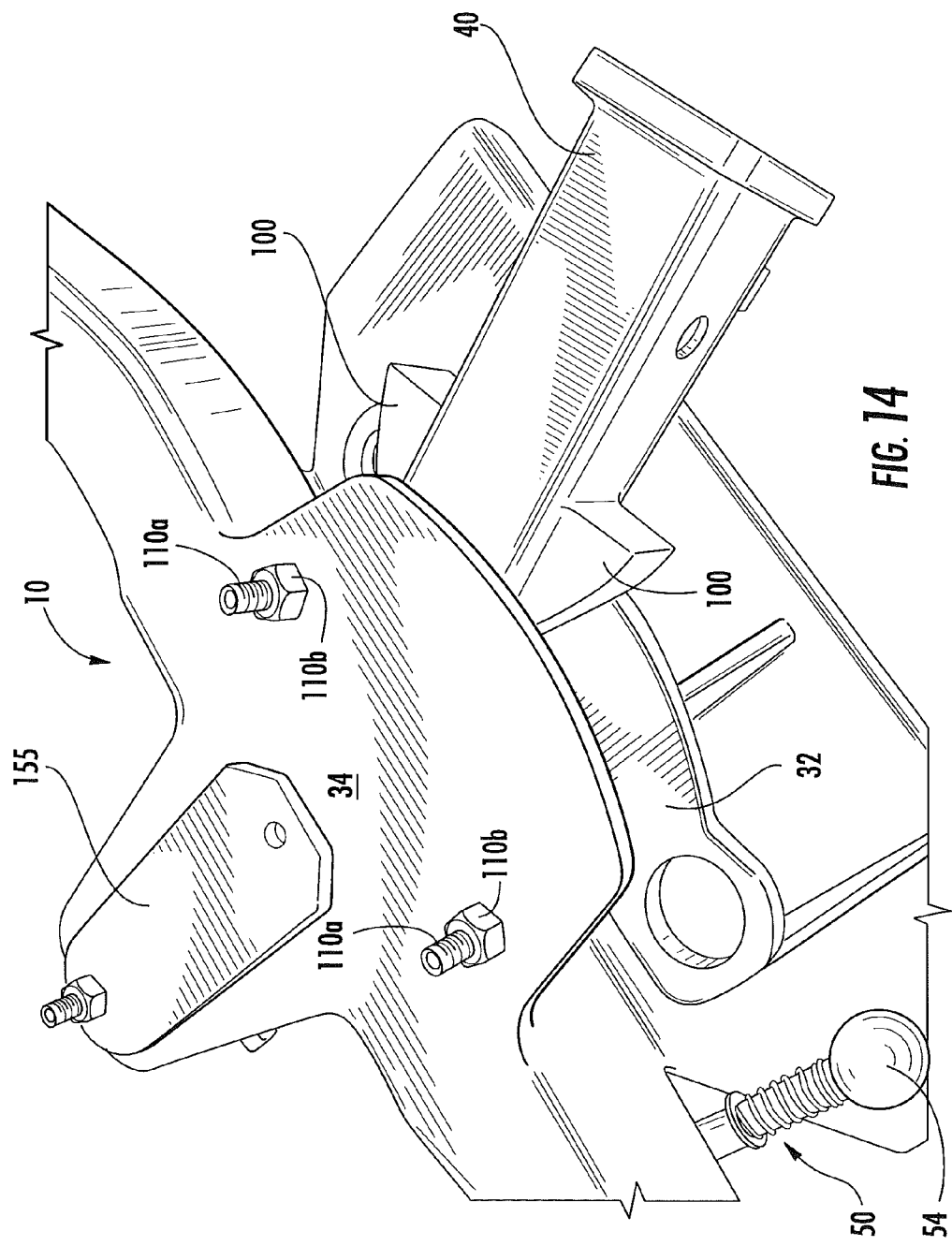
FIG. 14 is a top perspective view of the hitch apparatus of FIG. 13 with the tow bar in an extended and pivoted position.
Figure 15:
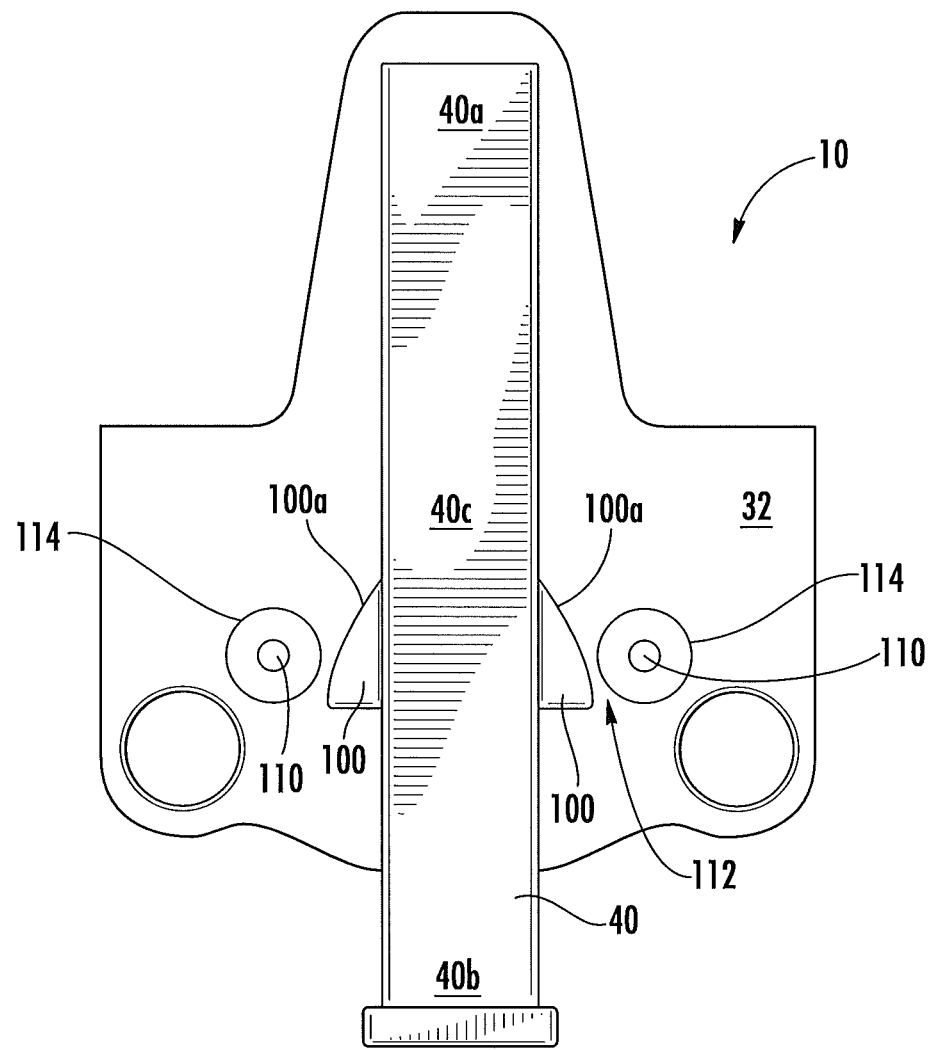
FIG. 15 is a top plan view of the hitch apparatus of FIG. 13 with the upper housing section removed and illustrating the tow bar guide wings and guide posts, according to some embodiments of the present invention.

Each tow bar guide door 37 is pivotable between a closed position (FIG. 8) and a fully open position (FIG. 10). As with the hitch apparatus 10 of FIGS. 1-7, the tow bar guide doors 37 of the hitch apparatus 10 of FIGS. 8-12 limit the extent to which the tow bar guide can pivot and guide the tow bar 40 back into the housing 30 when retracted. In FIG. 8, the tow bar 40 is in the fully retracted position and the tow bar guide doors 37 are closed. In FIG. 9, the locking mechanism handle 54 has been utilized to release the locking member 52 from the upper section slot 34a and allow the tow bar 40 to be extended. The tow bar 40 in FIG. 9 is extended straight out from the housing 30 but has not been pivoted. In FIG. 11, the tow bar 40 is pivoted slightly and is in contact with one of the tow bar guide doors 37, as illustrated. In FIG. 12, the tow bar 40 is fully pivoted and the extent to which the tow bar 40 is pivoted is controlled by the tow bar guide door 37.

FIGS. 13-18 illustrate a hitch apparatus 10 according to other embodiments of the present invention. The illustrated hitch apparatus 10 is similar in configuration and operation to the hitch apparatus 10 of FIGS. 1-7 and the hitch apparatus 10 of FIGS. 8-12 with the exception that tow bar guide wings 100 are utilized in lieu of the tow bar guide doors 37 of the embodiments of the FIGS. 1-7 and FIGS. 8-12. The tow bar guide wings 100 of the hitch apparatus 10 of FIGS. 13-18 serve the same function as the tow bar guide doors 37 described above, i.e., the tow bar guide wings 100 limit the extent to which the tow bar 40 can pivot when extended and guide the tow bar 40 back into the housing 30 when retracted.

A pair of guide posts 110 extend between the upper section 34 and lower section 32 within the housing 30 and form a restricted opening 112 (FIG. 15) through which the tow bar 40 extends. In the illustrated embodiment, guide posts 110 have threaded ends 110a and are secured to the upper and lower sections 34, 32 via correspondingly threaded nuts 110b. However, in other embodiments, each guide post 110 can be welded at respective ends to the upper and lower sections 34, 32, or otherwise integrally formed therewith as would be understood by those skilled in the art. Also, in other embodiments of the present invention, each guide post 110 can be a rod or pin that extends through the lower and upper sections 32, 34 of the housing 30. One end of the rod or pin can have a head or other similar structure and the opposite end can be configured to receive a cotter pin or other type of retaining member to prevent the rod or pin from becoming dislodged from the housing 30, as would be understood by those skilled in the art of the present invention. Various configurations are possible, without limitation.

In the illustrated embodiment, each tow bar guide wing 100 is attached to a respective opposite side of the tow bar 40 at the medial portion 40c thereof. Each tow bar guide wing 100 has an edge 100a that is configured to engage a respective guide post 110 and limit the extent to which the tow bar 40 can pivot relative to the housing 50 and to guide the tow bar 40 as the tow bar 40 is retracted into the housing 30. The edge 110a of each tow bar guide wing 100 has an outwardly curved or convex configuration and the edges 110a of the tow bar guide wings 110 converge in the direction of the proximal end 40a of the tow bar 40. As such, the extent to which the tow bar 40 can pivot relative to the housing 30 progressively increases as the tow bar 40 is progressively extended and, conversely, an extent to which the tow bar 40 can pivot relative to the housing 30 progressively decreases as the tow bar 40 is progressively retracted from an extended position into the housing 30.

Figure 16:
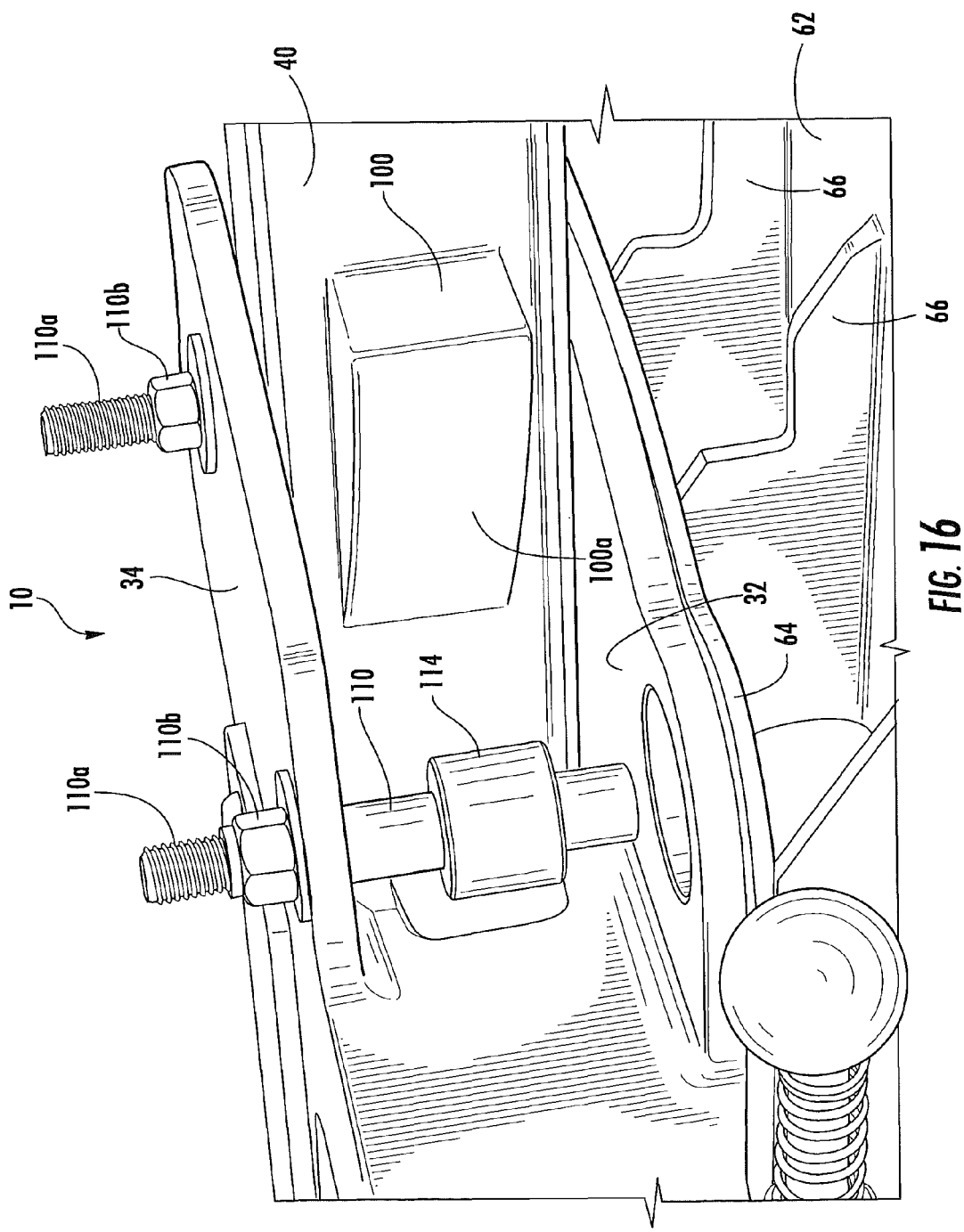
FIG. 16 is an enlarged partial side perspective view of the hitch apparatus of FIG. 13 illustrating a tow bar guide wing and guide post, according to some embodiments of the present invention.

According to some embodiments of the present invention, each guide post 110 may have an enlarged portion 114 that is configured to contact a respective tow bar guide wing 100, as illustrated in FIG. 16. This enlarged portion may be formed from a bearing material, such as NYLATRON® brand bearing material. In other embodiments, the enlarged portion 114 may be coated with a bearing material, such as PTFE or other low friction materials. In other embodiments, one or both guide posts 110 may utilize rollers or other types of bearings configured to contact a respective tow bar guide wing 100.

Embodiments of the present invention are not limited to the illustrated configuration of the guide posts 110 or the tow bar guide wings 100. The guide posts 110 and tow bar guide wings 100 can have various shapes and configurations, without limitation.

Figure 17:
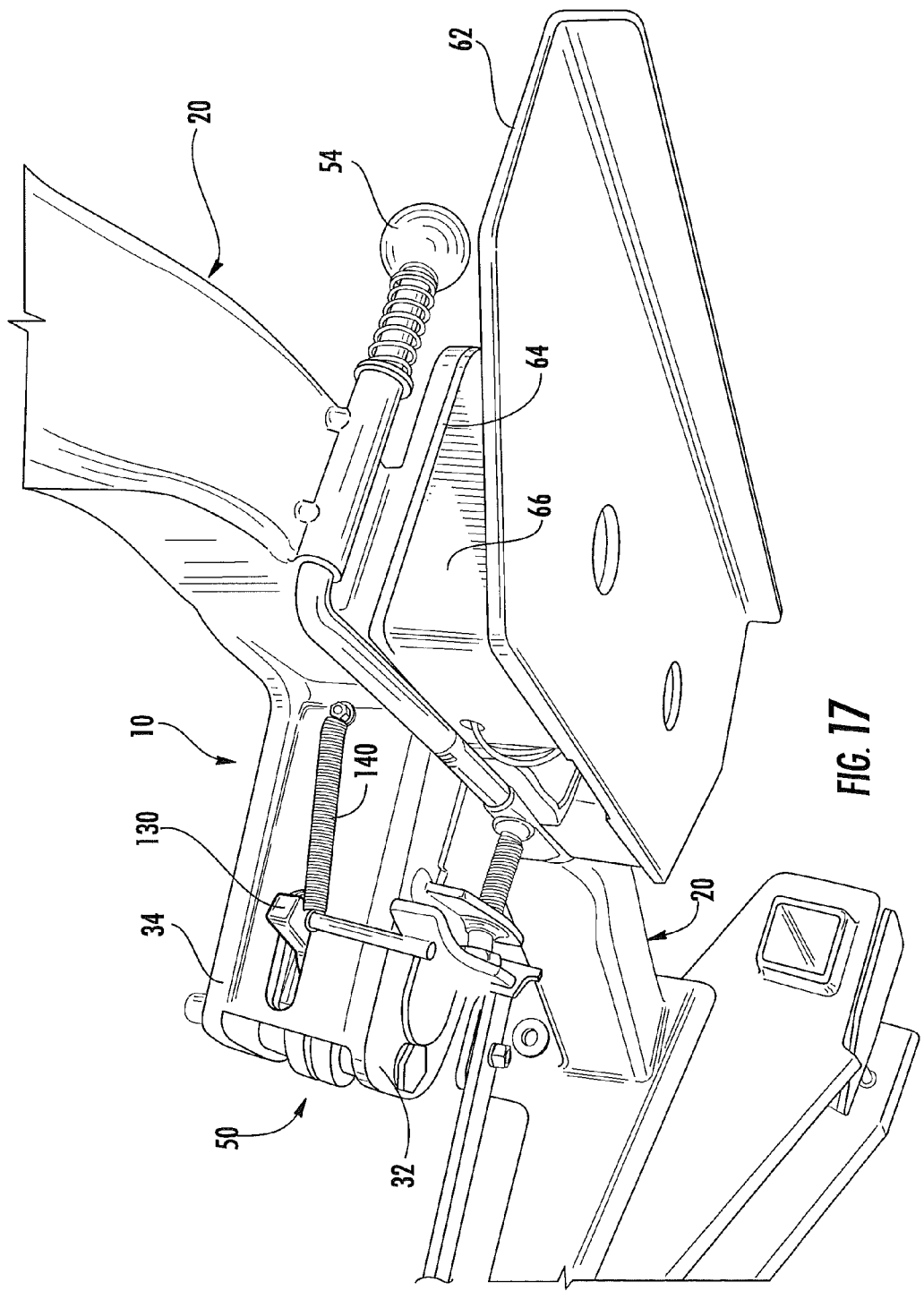
FIG. 17 is a bottom rear perspective view of the hitch apparatus of FIG. 13 illustrating a tow bar locking mechanism, according to some embodiments of the present invention.
Figure 18:
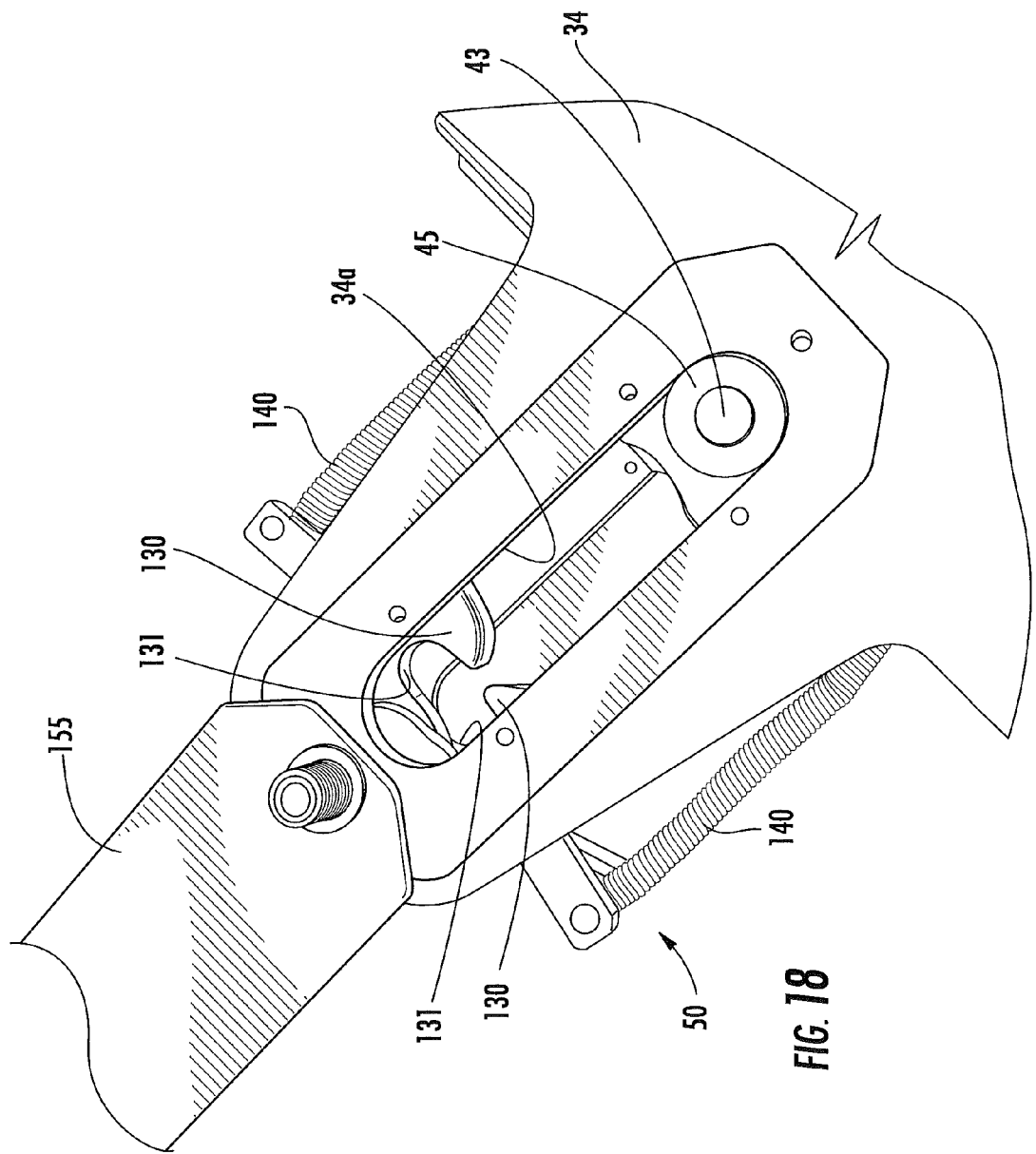
FIG. 18 is a partial top view of the hitch apparatus of FIG. 17 illustrating a portion of the tow bar guide locking mechanism.

Referring to FIGS. 17 and 18, the illustrated hitch apparatus 10 includes a locking mechanism 50 that is operably secured to the housing 30 and that is configured to releasably engage the tow bar 40 to maintain the tow bar 40 in a fully retracted position. The illustrated locking mechanism 50 is positioned at the rear or proximal end portion of the housing 30 and includes latching members 130 that are configured to releasably engage rod 43 for maintaining the tow bar 40 in the fully retracted position. The latching members 130 are rotatably mounted to the housing 30 and rotate from an open rod receiving position to a closed rod retaining position holding the tow bar 40 in the retracted position. Each latching member 130 includes a recess 131 configured to receive the rod 43 rod. A handle 54 is operably connected to the latching members 130 and, in response to user activation thereof, causes the latching members to rotate to the open position and release the guide member rod 43.

In the illustrated embodiment, a cover 155 is attached to the upper section 34 and overlies the latching members 130. Cover 155 is configured to prevent foreign matter from hindering operation of the locking mechanism 50. However, embodiments of the present invention do not require the cover 155.

In operation, a user activates handle 54 to disengage the latching members 130 from the rod 43. When the tow bar 40 is moved to the fully retracted position, the latching members 130 automatically grip the rod 43 similar to how a vehicle car door latching mechanism works. Various types of locking mechanisms may be utilized with embodiments of the present invention. For example a locking mechanism described in co-pending U.S. patent application Ser. No. 12/952,889, which is incorporated herein by reference in its entirety, may be utilized.

Also in the illustrated embodiment, a pair of biasing members 140 are configured to keep the latching members 130 in the locked position surrounding the rod 43 when the tow bar 40 is in the fully retracted position.

In other embodiments of the present invention, a biasing element, such as a spring (not shown) may be utilized to slightly urge the tow bar 40 outwardly from the housing 30 when the latching members 130 are disengaged from the rod 43 to facilitate one-hand operation. In other words, the tow bar 40 can be unlocked and extended slightly via operation of the locking mechanism handle 54.

In other embodiments of the present invention, one or both of the latching members 130 may include a portion that engages the rod 43 and urges the tow bar 40 to an extended position when the latching members 130 are rotated to the open rod receiving position.

Figure 19:
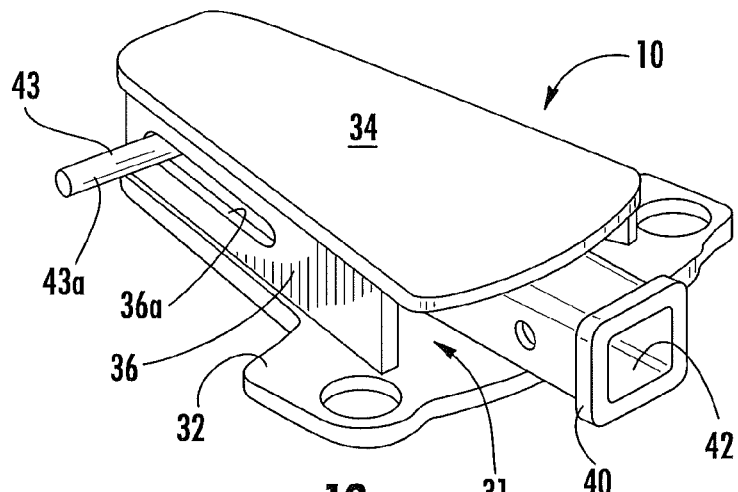
FIG. 19 is a top perspective view of a hitch apparatus, according to some embodiments of the present invention.
Figure 20:
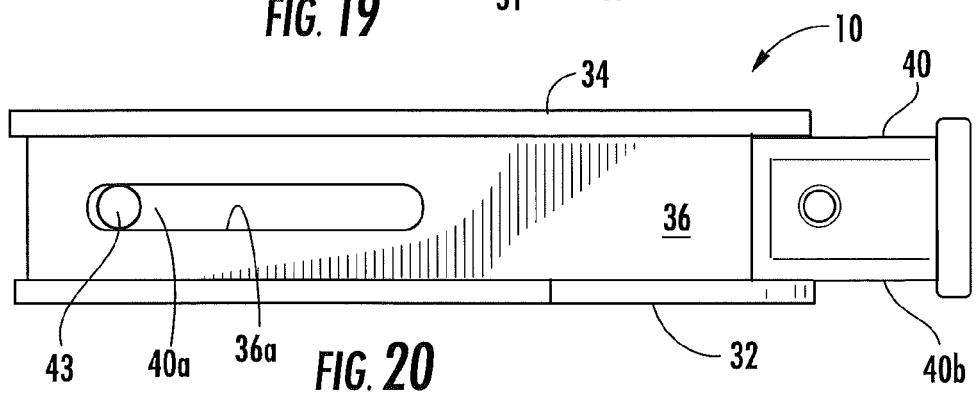
FIG. 20 is a side elevation view of the hitch apparatus of FIG. 19.
Figure 21:
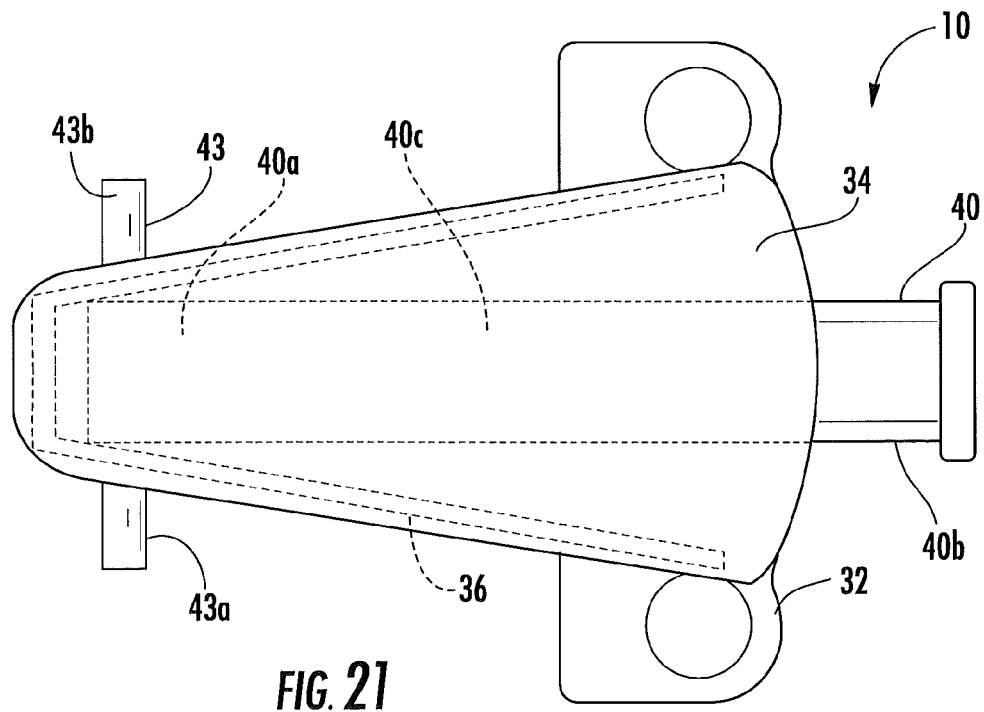
FIG. 21 is a top plan view of the hitch apparatus of FIG. 19.

FIGS. 19-21 illustrate a hitch apparatus 10 according to other embodiments of the present invention. The illustrated hitch apparatus 10 is similar in configuration and operation to the various hitch apparatus 10 of FIGS. 1-18 and may include tow bar guide doors or tow bar guide wings and guide posts, as described above. In addition, various types of locking mechanisms may be utilized as described above.

In the illustrated embodiment, the hitch apparatus 10 includes a housing 30 and a tow bar 40 movably disposed within the housing 30. The housing 30 defines a longitudinally extending forwardly opening cavity 31. The illustrated tow bar 40 is a tubular member having a proximal end portion 40a and a distal end portion 40b connected by a center or medial portion 40c. The tow bar distal end portion 40b includes an opening 42 that is configured to receive a coupling apparatus, such as a tow ball, pintle clip, pintle hook, lunette ring, clevis pin device, etc. In some embodiments, the tow bar distal end portion 40b may include a coupling apparatus integrally formed therewith.

Embodiments of the present invention are not limited to the illustrated tubular configuration of the tow bar 40. Other configurations may be utilized. For example, in some embodiments, the tow bar 40 may have other tubular cross-sectional shapes. In other embodiments, the tow bar 40 may be a solid member or plate. The tow bar 40 can be formed from various materials known to those skilled in the art. An exemplary material includes, but is not limited to, case-hardened steel.

The tow bar 40 is movable relative to the housing 30 between retracted and extended positions, and is pivotable relative to the housing 30 when in extended positions and in the fully retracted position. The illustrated hitch apparatus housing 30 is defined by a lower section 32, an upper section 34, and spaced apart side walls 36 sandwiched between the upper section 34 and lower section 32. In some embodiments, the lower section 32, upper section 34 and side walls 36 are welded together. In other embodiments, fasteners (e.g., bolts, screws, threaded rods, rivets, etc.) may be utilized to secure the lower section 32, upper section 34 and side walls 36 together. In some embodiments, a combination of fasteners and welding may be utilized, as would be understood by those skilled in the art.

Each of the side walls 36 has an elongated slot 36a formed therethrough. A guide member 43 extends outwardly from a proximal end 40a of the tow bar 40 and is operably engaged with the slots 36a in the side walls 36 to limit an extent to which the tow bar 40 can be extended. Although illustrated as a rod in FIGS. 19-21, the guide member 43 may have a similar configuration to the embodiment illustrated in FIGS. 1-7. For example, the respective end portions 43a, 43b of guide member 43 may be configured to engage each respective slot 36a. For example, rollers may be utilized on the respective end portions 43a, 43b of guide member 43 to engage the slots 36a. Embodiments of the present invention are not limited to the illustrated configuration of the guide member 43 in FIGS. 19-21.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A hitch apparatus, comprising:
    a housing configured to be attached to a vehicle, wherein the housing comprises opposite front and rear portions, wherein the housing comprises spaced-apart first and second sections that define a cavity, wherein the first section has an elongated slot formed therethrough, and wherein the housing comprises a pair of guide posts extending between the first and second sections to form a restricted opening;
    a tow bar movably disposed within the housing cavity, wherein the tow bar is a tubular member and comprises a distal end and an open proximal end, wherein the tow bar extends through the restricted opening and is movable relative to the housing between retracted and extended positions, and is pivotable relative to the housing when in an extended position, wherein a rod extends through the tow bar adjacent the tow bar proximal end, wherein a guide member is secured to a distal end of the rod and extends outwardly from the tow bar and is operably engaged with the slot in the first section, and wherein the tow bar comprises a pair of tow bar guide wings at a medial portion thereof, each extending outwardly from an opposite side portion of the tow bar, wherein each tow bar guide wing is configured to engage a respective post such that an extent to which the tow bar can pivot relative to the housing progressively increases as the tow bar is progressively extended; and
    a locking mechanism operably secured to the housing rear portion that releasably engages the tow bar to maintain the tow bar in a retracted position, wherein the locking mechanism comprises:
        a latching member rotatably mounted to the housing, wherein the latching member is configured to extend into the tow bar open proximal end and rotate from an open rod receiving position to a closed rod retaining position holding the tow bar in the retracted position; and
        a handle operably connected to the latching member, wherein the handle, in response to user activation thereof, rotates the latching member to the open rod receiving position and releases the rod.

2. The hitch apparatus of claim 1, wherein the guide member comprises a roller configured to rotate as the tow bar is extended and retracted.

3. The hitch apparatus of claim 1, wherein each guide post comprises an enlarged portion configured to contact a respective tow bar guide wing, wherein the enlarged portion comprises a bearing material.

4. The hitch apparatus of claim 1, wherein each tow bar guide wing comprises an outwardly diverging curvilinear edge portion that cooperates with a respective guide post when the tow bar is pivoted.

5. The hitch apparatus of claim 1, wherein each guide post comprises a bearing surface that engages a respective tow bar guide wing edge portion.

6. The hitch apparatus of claim 1, wherein each guide post comprises a bearing that engages a respective tow bar guide wing edge portion.

7. The hitch apparatus of claim 1, wherein the first and second sections are plate members.

8. The hitch apparatus of claim 1, further comprising a bearing member attached to an interior side of the first section in face-to-face contacting relationship therewith, wherein the bearing member has an elongated slot formed therethrough that is aligned with the first section elongated slot.

9. The hitch apparatus of claim 8, wherein the tow bar is in contacting relationship with the bearing member as the tow bar is moved between retracted and extended positions.

10. The hitch apparatus of claim 8, wherein the bearing member comprises material having a coefficient of friction less than 0.5.

11. The hitch apparatus of claim 1, further comprising a coating of bearing material applied to an interior side of the first section, and wherein the tow bar is in contacting relationship with the bearing material as the tow bar is moved between retracted and extended positions.

12. The hitch apparatus of claim 1, further comprising a bearing member attached to the tow bar, wherein the bearing member is in contacting relationship with one of the first and second housing sections as the tow bar is moved between retracted and extended positions.

13. The hitch apparatus of claim 1, wherein the tow bar comprises a coating of bearing material, wherein the bearing material is in contacting relationship with one of the first and second housing sections as the tow bar is moved between retracted and extended positions.

14. The hitch apparatus of claim 1, wherein at least a portion of the tow bar is encased within a sleeve of bearing material, wherein the sleeve of bearing material is in contacting relationship with the first and second housing sections as the tow bar is moved between retracted and extended positions.

15. The hitch apparatus of claim 1, wherein the distal end of the tow bar is configured to removably receive a coupling apparatus.

16. The hitch apparatus of claim 1, wherein the distal end of the tow bar comprises a coupling apparatus integrally formed therewith.

17. A hitch apparatus, comprising:
a housing configured to be attached to a vehicle, wherein the housing comprises opposite front and rear portions, wherein the housing comprises spaced-apart first and second sections that define a cavity, wherein the first and second sections each have an elongated slot formed therethrough, and wherein the housing comprises a pair of guide posts extending between the first and second sections to form a restricted opening;
a tow bar movably disposed within the housing cavity, wherein the tow bar is a tubular member and comprises a distal end and an open proximal end, wherein the tow bar extends through the restricted opening and is movable relative to the housing between retracted and extended positions, and is pivotable relative to the housing when in an extended position, wherein a rod extends through the tow bar adjacent the tow bar proximal end, the rod having opposite ends, wherein a pair of guide members extend outwardly from respective opposite sides of the tow bar, each guide member secured to a respective end of the rod, wherein each guide member is operably engaged with the slot in a respective one of the first and second sections, and wherein the tow bar comprises a pair of tow bar guide wings at a medial portion thereof, each extending outwardly from an opposite side portion of the tow bar, wherein each tow bar guide wing is configured to engage a respective post such that an extent to which the tow bar can pivot relative to the housing progressively increases as the tow bar is progressively extended; and
a locking mechanism operably secured to the housing rear portion that releasably engages the tow bar to maintain the tow bar in a retracted position, wherein the locking mechanism comprises:
a latching member rotatably mounted to the housing, wherein the latching member is configured to extend into the tow bar open proximal end and rotate from an open rod receiving position to a closed rod retaining position holding the tow bar in the retracted position; and
a handle operably connected to the latching member, wherein the handle, in response to user activation thereof, rotates the latching member to the open rod receiving position and releases the rod.

18. The hitch apparatus of claim 17, wherein the first and second guide members comprise rollers configured to rotate as the tow bar is extended and retracted.

19. The hitch apparatus of claim 17, wherein each guide post comprises an enlarged portion configured to contact a respective tow bar guide wing, wherein the enlarged portion comprises a bearing material.

20. The hitch apparatus of claim 17, wherein each tow bar guide wing comprises an outwardly diverging curvilinear edge portion that cooperates with a respective guide post when the tow bar is pivoted.

21. The hitch apparatus of claim 17, wherein each guide post comprises a bearing surface that engages a respective tow bar guide wing edge portion.

22. The hitch apparatus of claim 17, wherein each guide post comprises a bearing that engages a respective tow bar guide wing edge portion.

23. The hitch apparatus of claim 17, wherein the first and second sections are plate members.

24. The hitch apparatus of claim 17, further comprising a first bearing member attached to an interior side of the first section, and a second bearing member attached to an interior side of the second section, wherein each bearing member has an elongated slot formed therethrough that is aligned with a respective elongated slot in one of the first and second sections.

25. The hitch apparatus of claim 24, wherein the tow bar is in contacting relationship with the first and second bearing members as the tow bar is moved between retracted and extended positions.

26. The hitch apparatus of claim 24, wherein each bearing member comprises material having a coefficient of friction less than 0.5.

27. The hitch apparatus of claim 17, further comprising a coating of bearing material applied to an interior side of the first section, and wherein the tow bar is in contacting relationship with the bearing material as the tow bar is moved between retracted and extended positions.

28. The hitch apparatus of claim 17, further comprising a bearing member attached to the tow bar, wherein the bearing member is in contacting relationship with one of the first and second housing sections as the tow bar is moved between retracted and extended positions.

29. The hitch apparatus of claim 17, wherein the tow bar comprises a coating of bearing material, wherein the bearing material is in contacting relationship with one of the first and second housing sections as the tow bar is moved between retracted and extended positions.

30. The hitch apparatus of claim 17, wherein at least a portion of the tow bar is encased within a sleeve of bearing material, wherein the sleeve of bearing material is in contacting relationship with the first and second housing sections as the tow bar is moved between retracted and extended positions.

31. The hitch apparatus of claim 17, wherein the distal end of the tow bar is configured to removably receive a coupling apparatus.

32. The hitch apparatus of claim 17, wherein the distal end of the tow bar comprises a coupling apparatus integrally formed therewith.

* * * * *

UNITED STATES PATENT AND TRADEMARK OFFICE
CERTIFICATE OF CORRECTION

| | |
|---|---|
| PATENT NO. | : 8,905,425 B2 |
| APPLICATION NO. | : 12/970439 |
| DATED | : December 9, 2014 |
| INVENTOR(S) | : Williams, Jr. et al. |

Page 1 of 1

It is certified that error appears in the above-identified patent and that said Letters Patent is hereby corrected as shown below:

In the Specification

Column 9, Line 40: correct "degrees)(90°."
                to read -- degrees (90°). --

Signed and Sealed this
Twenty-first Day of April, 2015

Michelle K. Lee
*Director of the United States Patent and Trademark Office*